US012806664B2

(12) United States Patent
Liang

(10) Patent No.: US 12,806,664 B2
(45) Date of Patent: Nov. 24, 2026

(54) RECORD CLEANING MACHINE AND CONTROL METHOD THEREOF

(71) Applicant: Foshan Heshan E-commerce Co., Ltd., Foshan (CN)

(72) Inventor: Tian Liang, Foshan (CN)

(73) Assignee: Foshan Heshan E-commerce Co., Ltd., Foshan (CN)

( * ) Notice: Subject to any disclaimer, the term of this patent is extended or adjusted under 35 U.S.C. 154(b) by 103 days.

(21) Appl. No.: 18/891,037

(22) Filed: Sep. 20, 2024

(65) Prior Publication Data

US 2026/0084190 A1 Mar. 26, 2026

(51) Int. Cl.
*B08B 3/12* (2006.01)
*B08B 5/02* (2006.01)

(52) U.S. Cl.
CPC . *B08B 3/12* (2013.01); *B08B 5/02* (2013.01)

(58) Field of Classification Search
CPC ........... G11B 3/589; B23Q 11/02; B08B 3/04; B08B 3/044; B08B 3/048; B08B 3/10; B08B 3/102; B08B 3/12; B08B 7/026; B08B 7/028; B08B 7/04; B08B 11/00; B08B 11/02
See application file for complete search history.

(56) References Cited

U.S. PATENT DOCUMENTS 3,479,222 A * 11/1969 David .................... B08B 11/00 15/88.4
4,941,006 A * 7/1990 Kurematsu .......... G03D 13/006 396/626
5,126,992 A * 6/1992 Lavinsky ............. G11B 23/505 15/302
2013/0298939 A1* 11/2013 Goldman .................. B08B 3/12 134/1
2014/0197019 A1* 7/2014 Kojer .................... F24C 15/102 200/600
2014/0318573 A1* 10/2014 Cheon ....................... B08B 3/12 134/1
2019/0337023 A1* 11/2019 Kirmuss ................... B08B 3/12

FOREIGN PATENT DOCUMENTS

CN 215031796 U * 12/2021
DE 102019111687 A1 * 11/2020 ............ G11B 3/589

OTHER PUBLICATIONS

Machine Translation of Breu, DE-102019111687-A1, Nov. 2020. (Year: 2020).*
Machine Translation of Wu, CN-215031796-U, Dec. 2021. (Year: 2021).*

* cited by examiner

*Primary Examiner* — David G Cormier
(74) *Attorney, Agent, or Firm* — Maier & Maier, PLLC

(57) ABSTRACT

A record cleaning machine and control method thereof, the record cleaning machine includes a housing, a cleaning container, a support assembly, a water supply system, an air drying system, an ultrasonic generator, and a control system. The water supply system includes a water storage box, a first pump, and a second pump. The record cleaning machine supplies water to the cleaning tank through the first pump and discharges water from the cleaning tank through the second water pump, which can achieve precise water addition and improve the cleaning effect.

15 Claims, 21 Drawing Sheets

RECORD CLEANING MACHINE AND CONTROL METHOD THEREOF

TECHNICAL FIELD

The application relates to the cleaning machine, in particular to a record cleaning machine and control method thereof.

BACKGROUND

A record cleaning machine is used to clean the records, such as the vinyl records. The existing record cleaning machines require users to add water manually, which is complex to operate. The inaccurate amount of water added manually may affect the cleaning effect.

SUMMARY

To solve the above technical problems, the present application provides a record cleaning machine and control method thereof, which could discharge water automatically and improve cleaning efficiency.

In the first aspect, the present application provides a record cleaning machine, comprising:

- a housing;
- a cleaning container, disposed in the housing, and provided with a cleaning tank;
- a support assembly, disposed at an opening of the cleaning tank, and configured to support a record and drive the record to rotate;
- a water supply system, comprising:
  - a water storage box, disposed at the housing;
  - a first pump, communicated with the water storage box and the cleaning tank, and configured to supply water to the cleaning tank; and
  - a second pump, communicated with the water storage box and the cleaning tank, and configured to discharge water in the cleaning tank;
- an air drying system, configured to dry the record;
- an ultrasonic generator, disposed at a side wall of the cleaning container; and
- a control system, connected with the support assembly, the first pump, the second pump, the air drying system and the ultrasonic generator.

According to some embodiments of the present application, the housing comprises:

- a bottom shell;
- a support shell, an end of the support shell is connected to the bottom shell, and the cleaning container is disposed in the support shell;
- a top shell, connected to another end of the support shell, and provided with a receiving hole, the record being capable of passing through the receiving hole; and
- a transparent cover, disposed on the top shell.

According to some embodiments of the present application, the record cleaning machine further comprises a first bracket disposed in the housing, and the cleaning container is pressed tightly by the first bracket from above.

According to some embodiments of the present application, the support assembly comprises:

- first adapters, disposed at the first bracket, and being capable of supporting a first record and driving the first record to rotate;
- second adapters, detachably disposed at the housing, and being capable of supporting a second record and driving the second record to rotate;
- third adapters, detachably disposed at the housing, and being capable of supporting a third record and driving the third record to rotate;
- a first driver, disposed at the first bracket, and connected to the first adapters to drive the first record to rotate;
- a second driver, disposed at the first bracket, and detachably connected to the second adapters to drive the second record to rotate; and
- a third driver, disposed at the first bracket, and detachably connected to the third adapters to drive the third record to rotate.

According to some embodiments of the present application, each of the first adapters comprises:

- a first roller seat, disposed at the first bracket; and
- a first roller, rotatably connected to the first roller seat, and the first roller of at least one of the first adapters being connected to the first driver.

According to some embodiments of the present application, each of the second adapters and the third adapters comprises:

- a second roller seat, detachably disposed at the housing;
- a second roller, rotatably connected to the second roller seat, the second roller of at least one of the second adapters being detachably connected to the second driver, and the third roller of at least one of the third adapters being detachably connected to the third driver; and
- a support, disposed at an end of the second roller seat and in the cleaning tank, the supports of the second adapters are matched with the second record, and the supports of the third adapters are matched with the third record.

According to some embodiments of the present application, the second roller comprises:

- a first wheel body, rotatably connected to the second roller seat;
- a second wheel body, rotatably connected to the second roller seat, and slidably connected to the first wheel body;
- a third wheel body, disposed between the first wheel body and the second wheel body; and
- a first elastic, disposed between the first wheel body and the second wheel body, and being capable of pushing the first wheel body and the second wheel body away from each other.

According to some embodiments of the present application, the support assembly further comprises:

- a slider, slidably disposed at the first bracket, and the second driver and the third driver both are disposed at the slider;
- a first button, disposed at the first bracket, and being capable of pushing the slider to slide in a direction away from the cleaning tank; and
- a second elastic, disposed between the slider and the first bracket, being capable of pushing the slider to slide in a direction close to the cleaning tank.

According to some embodiments of the present application, the support assembly further comprises a first stroke switch connected with the control system, and a contact plate being provided on the slider and being capable of abutting against the first stroke switch.

According to some embodiments of the present application, the air drying system comprises:

- a first fan and a second fan, disposed at the first bracket; and
- a first air outlet piece, disposed at the first bracket, and provided with a first air outlet and a second air outlet, the first air outlet blowing out airflow of the first fan in a horizontal direction or an inclined upward direction, and the second air outlet blowing out airflow of the second fan in an inclined downward direction.

According to some embodiments of the present application, the air drying system further comprises:

a third fan and a fourth fan, disposed at the first bracket; and a second air outlet piece, disposed at the first bracket, and provided with a third air outlet and a fourth air outlet, the third air outlet blowing out airflow of the third fan in the horizontal direction, and the fourth air outlet blowing out airflow of the fourth fan in the horizontal direction.

According to some embodiments of the present application, the record cleaning machine further comprises a second bracket disposed in the housing, and the water supply system is disposed in the second bracket.

According to some embodiments of the present application, the water storage box comprises:

a box body, provided with a water storage chamber with an open end, the first pump and the second pump being capable of communicating with the water storage chamber respectively, and a side wall of the box body away from the cleaning container being made of transparent material and provided with a water level gauge;

a water storage box shell, configured to seal the water storage chamber;

a water storage box outer cover, being provided on the second bracket, and the box body being disposed at the water storage box outer cover slidably; and a first filter, disposed in the box body.

According to some embodiments of the present application, the water supply system further comprises:

a temperature sensor, configured to detect water temperature in the cleaning tank, and connected with the control system;

a water level gauge, configured to detect water level in the cleaning tank, and connected with the control system.

According to some embodiments of the present application, the control system comprises:

a circuit board, disposed inside the housing;

a second button, connected to the circuit board, including a plurality of sub keys, at least one of the sub keys being configured to confirm a current operation, and at least another of the sub keys being configured to cancel the current operation;

a screen, disposed at the housing, and connected to the circuit board; and a power assembly, connected to the circuit board.

According to some embodiments of the present application, the power assembly comprises:

a power switch, connected to the circuit board;

a child lock switch, connected to the circuit board; and a gear selection switch, connected to the circuit board, and configured to select a working mode.

According to some embodiments of the present application, a filtering groove is provided at a bottom of the housing, and an air inlet is provided at a bottom of the filtering groove; and the record cleaning machine further comprises a second filter disposed in the filtering groove and a USB connector disposed at the housing, and an inner wall of the filtering groove is provided with a plug hole matched with the USB connector.

According to some embodiments of the present application, the record cleaning machine further comprises a handle disposed at the housing.

In the second aspect, the present application provides a method for controlling a record cleaning machine, the record cleaning machine having a cleaning mode, and in the cleaning mode, the method comprising:

activating a first pump of a water supply system of the record cleaning machine to supply water to a cleaning tank of a cleaning container of the record cleaning machine, and stopping supplying water when a water level in the cleaning tank reaches a preset value;

driving a record in the cleaning tank to rotate within a first preset time, and activating an ultrasonic generator of the record cleaning machine to clean the record;

activating a second pump of the water supply system to discharge water from the cleaning tank; and activating an air drying system of the record cleaning machine to dry the record.

According to some embodiments of the present application, the record cleaning machine further has a cleaning only mode, and in the cleaning only mode, the method comprises:

activating the first pump to supply water to the cleaning tank, and stopping supplying water when the water level in the cleaning tank reaches the preset value;

driving the record in the cleaning tank to rotate within the first preset time to clean the record; and activating the second pump to discharge the water from the cleaning tank.

According to some embodiments of the present application, the record cleaning machine further has an air drying only mode, and in the air drying only mode, the method comprises:

activating the air drying system to dry the record once.

According to some embodiments of the present application, the method further comprises:

pressing a first button of a support assembly of the record cleaning machine and releasing the first button within a third preset time to pause operation of the record cleaning machine;

pressing a first sub key of a second button of the record cleaning machine to continue the operation of the record cleaning machine;

discharging water in the cleaning tank by pressing the first button for more than a fourth preset time when the record cleaning machine is running; and discharging water in the cleaning tank by pressing the first button three times and releasing the first button within the third preset time when the record cleaning machine is not running.

According to some embodiments of the present application, the method further comprises:

pressing a third sub key and a fourth sub key of a second button of the record cleaning machine simultaneously to start water level adjustment; and pressing the third sub key or the fourth sub key to adjust the water level in the cleaning tank.

The record cleaning machine of the present application supplies water to the cleaning tank through the first pump, and discharge the water from the cleaning tank through the second water pump, which can achieve precise water addition and improve the cleaning effect.

BRIEF DESCRIPTION OF THE DRAWINGS

The technical solution of the present application will be more apparent from the following brief description of the accompanying drawings, which merely refer to some embodiments of the present application obviously, and the skilled in art can obtain other drawings based on these drawings without exceeding the scope of protection claimed to protect in the present application.

DETAILED DESCRIPTION OF EMBODIMENTS

There're only some exemplary embodiments are briefly described below. As recognized by the skilled in the art, the described embodiments can be modified in various ways without departing from the spirit or scope of the present application. Therefore, the figures and descriptions are considered to be exemplary rather than restrictive in nature.

It should be understood that, in the description of the present application, the terms "center", "longitudinal", "transverse", "length", "width", "thickness", "up", "down", "front", "back", "left", "right", "straight", "horizontal", "top", "bottom", "inside", "outside", "clockwise", "counter-clockwise" and other directional or positional relationships indicated are based on the directional or positional relationships shown in the accompanying drawings, and are only for the convenience of describing the present application and simplifying the description, and do not indicate or imply that the device or component referred to must have a specific orientation, or be constructed and operated in a specific orientation. Therefore, it cannot be understood as a limitation on the present application. In addition, the terms "first" and "second" are only used for descriptive purposes and cannot be understood as indicating or implying relative importance or implying the number of technical features indicated. Thus, the features limited to "first" or "second" may explicitly or implicitly include one or more of the aforementioned features. And, unless otherwise defined or implied herein, in the description of the present application, the meaning of "multiple" refers to two or more.

It should be noted that, in the description of the present application, unless otherwise defined or implied herein, the terms "installation", "connection", and "connecting" should be broadly understood, for example, they can be fixed connections, detachable connections, or integrated connections; they can be mechanical connections, electrical connections, or can communicate with each other; they can be directly connected or indirectly connected through an intermediate medium; and they can be connections within two components or interaction relationships between two components. The specific meanings of the above terms in the present application can be understood according to the specific situation for the skilled in the art.

The existing record cleaning machines have the following problems:

1. Manual water addition is required, but the amount of water added is inaccurate;
2. Insufficient wind force makes it difficult to completely dry the cleaned records;
3. For the records of different sizes, the process of adjusting the machine is cumbersome and the efficiency is reduced;
4. Low level of intelligence, such as there's no screen prompts for operation.

Figure 1:
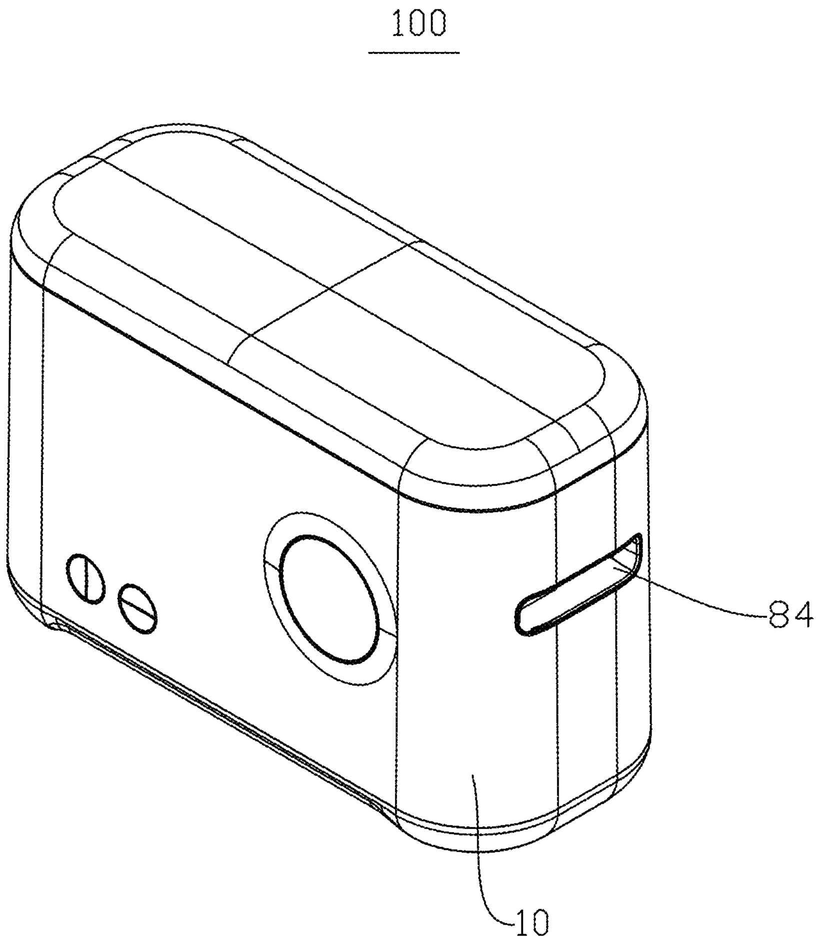
FIG. 1 is a schematic diagram of a record cleaning machine according to an embodiment of the present application.
Figure 2:
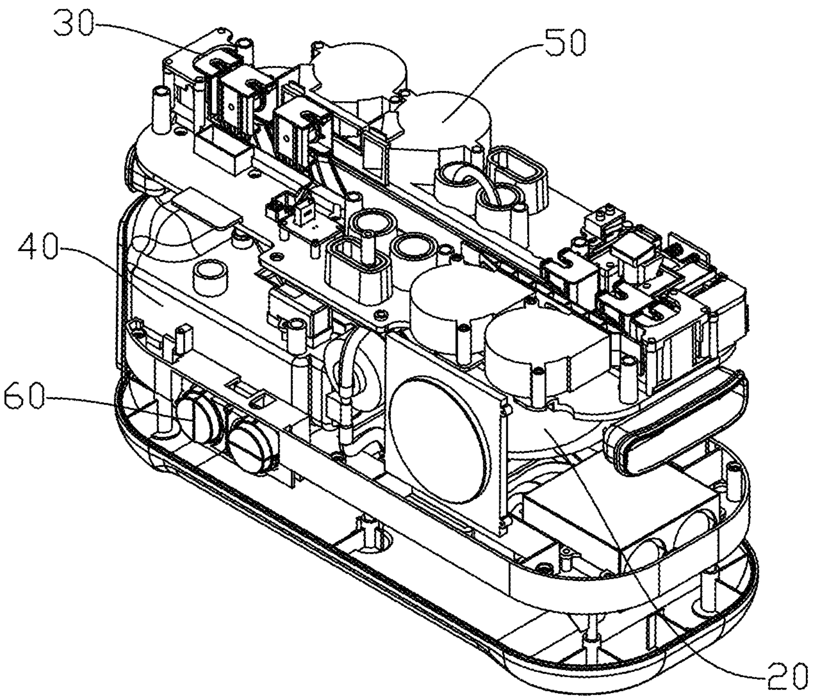
FIG. 2 is a schematic diagram of an internal structure of the record cleaning machine according to an embodiment of the present application.
Figure 3:
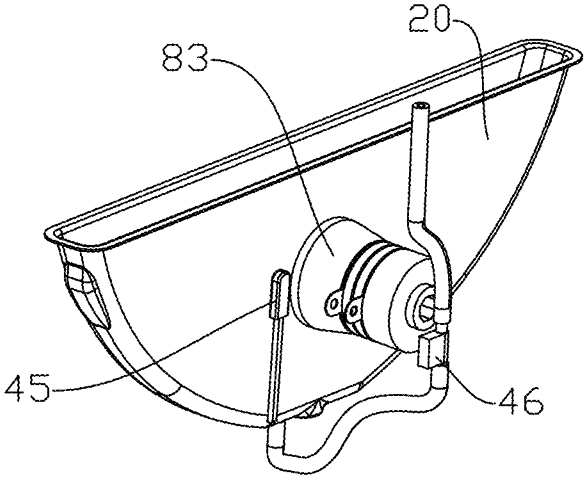
FIG. 3 is a schematic diagram of an ultrasonic generator and a cleaning container according to an embodiment of the present application.

As shown in FIGS. 1, 2 and 3, an embodiment of the present application provides a record cleaning machine 100 comprising a housing 10, a cleaning container 20, a support assembly 30, a water supply system 40, an air drying system 50, a control system 60, and an ultrasonic generator 83. Optionally, the record is a vinyl record.

Figure 4:
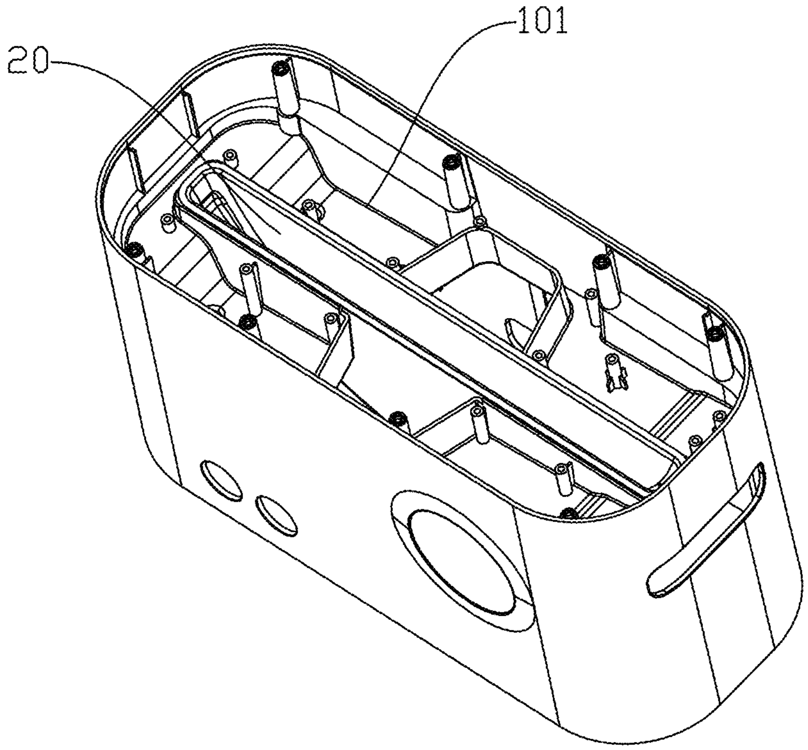
FIG. 4 is a schematic diagram of installation of a cleaning container to a housing in the embodiment of the present application.
Figure 5:
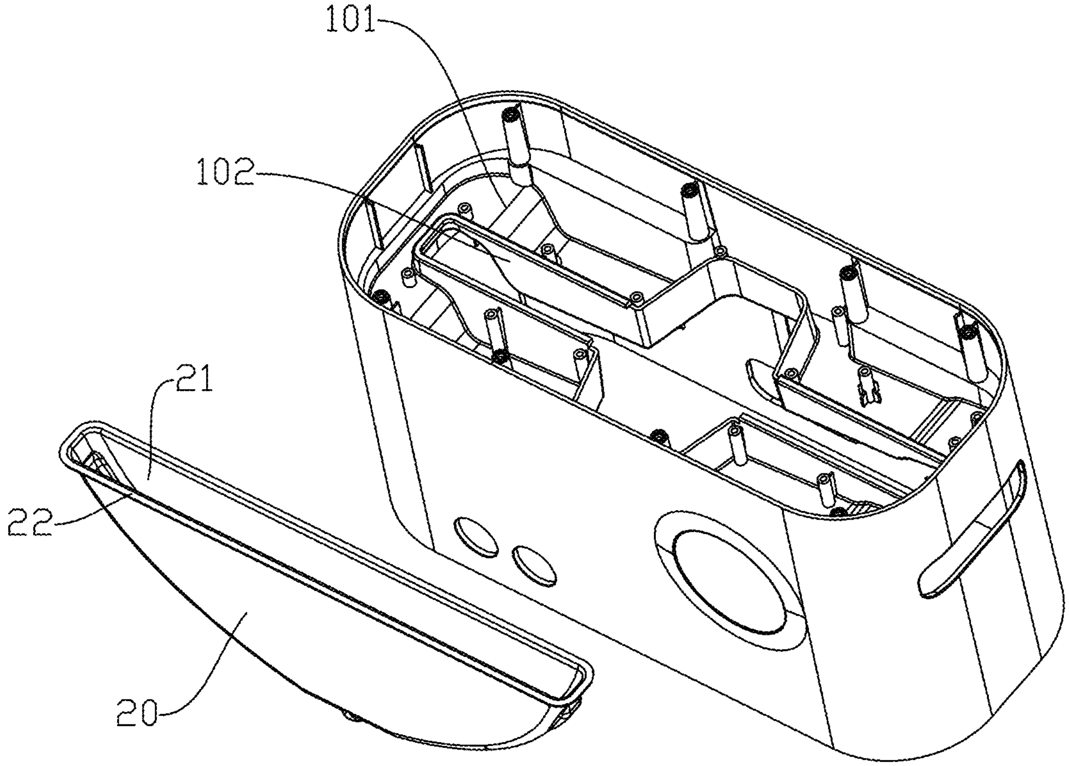
FIG. 5 is a schematic diagram of the cleaning container and a support plate according to an embodiment of the present application.

An interior of the housing 10 is a cavity, and the cleaning container 20 is installed inside the cavity of the housing 10. As shown in FIGS. 4 and 5, a support plate 101 is provided inside the cavity of the housing 10, and a through hole 102 is provided on the support plate 101. The cleaning container 20 is mounted on the support plate 101. The cleaning container 20 is provided with a cleaning tank 21 with a top opening. A top of the cleaning container 20 is provided with a flange 22, and a bottom of the cleaning container 20 passes through the through hole 102. The flange 22 abuts against the support plate 101 to mount the cleaning container 20 on the support plate 101. Optionally, the cleaning container 20 is roughly semi-circular to fit the shape of the record. The cleaning tank 21 is used to hold water for cleaning records. The water used for cleaning records in this embodiment can be pure water or water containing cleaning agents.

Figure 6:
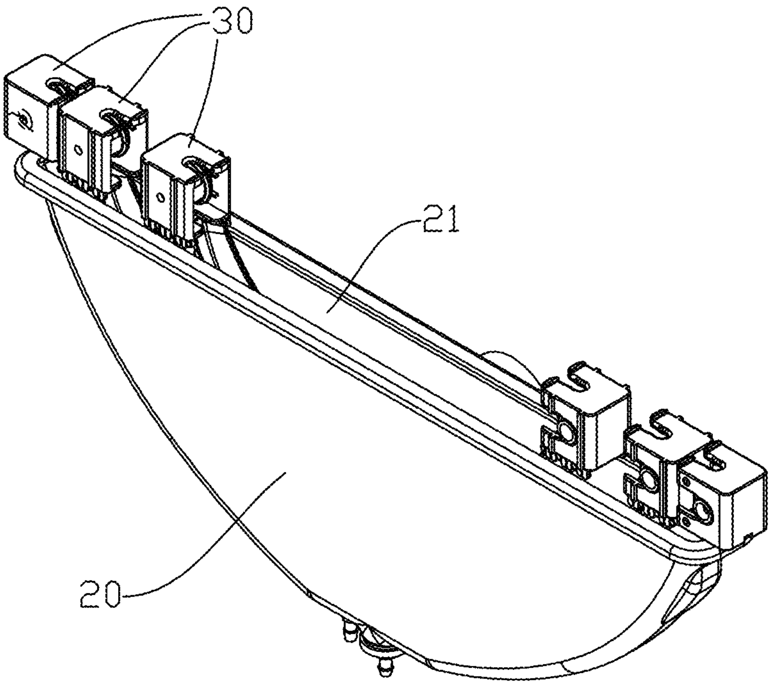
FIG. 6 is a schematic diagram of a support assembly according to an embodiment of the present application.

As shown in FIG. 6, the support assembly 30 is installed at an opening of the cleaning tank 21, and is used to support the record and drive it to rotate. Optionally, the support assembly 30 is supported by components within the cavity of the housing 10. The support assembly 30 includes a plurality of adapters, each of which is adapted to different sizes of records to meet the cleaning needs of various specifications of records.

Figure 7:
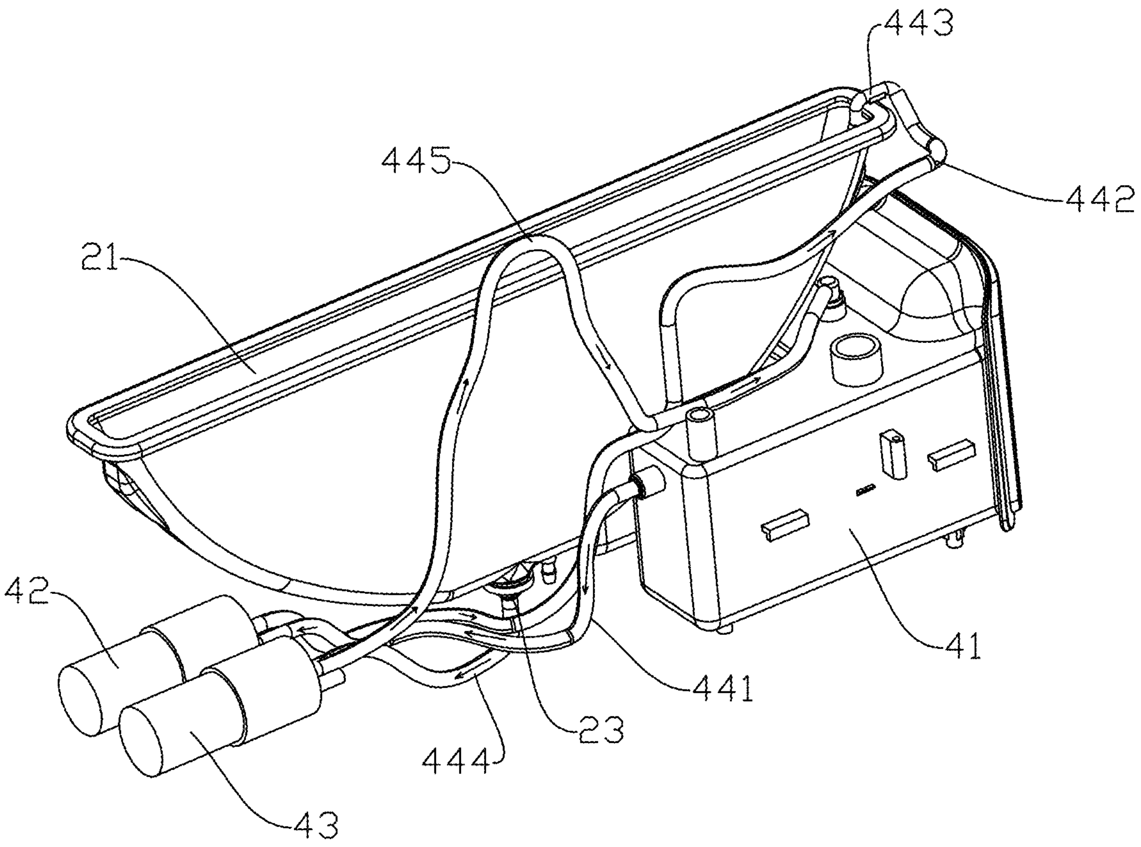
FIG. 7 is a schematic diagram of a water supply system according to an embodiment of the present application.

As shown in FIG. 7, the water supply system 40 includes a water storage box 41, a first pump 42, and a second pump 43. The water storage box 41 is installed at the housing 10 for storing water.

The first pump 42 is communicated with the water storage box 41 and the cleaning tank 21. For example, an outlet of the water storage box 41 is communicated with the first pump 42 through a first pipeline 441, the first pump 42 is communicated with a third pipeline 443 through a second pipeline 442, and the third pipeline 443 is located at a top of the cleaning tank 21 and extends into the cleaning tank 21 along a tank wall thereof. Water in the water storage box 41 is sent into the cleaning tank 21 after the first pump 42 is activated. The arrows in FIG. 7 indicate the direction of water flow.

The second pump 43 is communicated with the water storage box 41 and the cleaning tank 21. For example, a bottom of the cleaning tank 21 is provided with a drainage port 23, which is communicated with the second pump 43 through a fourth pipeline 444, and the second pump 43 is communicated with an inlet of the water storage box 41 through a fifth pipeline 445. Water in the cleaning tank 21 is pumped out and sent to the water storage box 41 after the second pump 43 is activated. Optionally, the first pipeline 441, the second pipeline 442, the fourth pipeline 444, and the fifth pipeline 445 are flexible pipes, while the third pipeline 443 is a rigid pipe.

The third pipeline 443 is installed on a side of the cleaning tank 21, and water output from the third pipeline 443 can flow into along an inclined wall thereof, reducing risk of splashing water and improving safety of the record cleaning machine 100.

The air drying system 50 is installed in the cavity of the housing 10, and is used for drying the cleaned records.

The ultrasonic generator 83 is installed at a side wall of the cleaning container 20. The ultrasonic generator 83 generates mechanical vibration under an action of an electric field and converts this vibration into high-frequency sound waves. When ultrasonic waves generated by the ultrasonic generator 83 act on water, it will cause vibration and produce many tiny bubbles. These bubbles will rapidly generate and instantly burst under action of ultrasound, causing temperature changes in the microenvironment and leading to the impact of liquid microbeam jets. This impact can effectively loosen dirt on surface of the record, achieving a deep cleaning effect.

The control system 60 is connected with the support assembly 30, the first pump 42, the second pump 43, the air drying system 50, and the ultrasonic generator 83 to control operation of the support assembly 30, the first pump 42, the second pump 43, the air drying system 50 and the ultrasonic generator 83.

Optionally, the process of using the record cleaning machine 100 to clean records comprises:

- placing record to be cleaned into the cleaning tank 21, and supporting it by adapters matched with the record;
- activating the first pump 42 by the control system 60 to supply water to the cleaning tank 21, and stopping supplying water when water level in the cleaning tank 21 reaches a preset value;
- rotating the record in the cleaning tank 21 by the support assembly 30 to clean the record;
- activating the second pump 43 to discharge the water from the cleaning tank 21; and
- activating the air drying system 50 to dry the record.

The record cleaning machine 100 of this embodiment can automatically supply and discharge water to the cleaning tank 21, and achieve precise water addition, thus avoiding the inaccuracy of manual water addition and making the operation simple. Excessive water in cleaning tank 21 may cause damage to the labels on the record and increase resistance that drives the record to rotate. Insufficient water in cleaning tank 21 can also reduce the cleaning effect. Accurate water addition can enable the record cleaning machine 100 to operate in optimal working conditions, improving cleaning efficiency.

Figure 8:
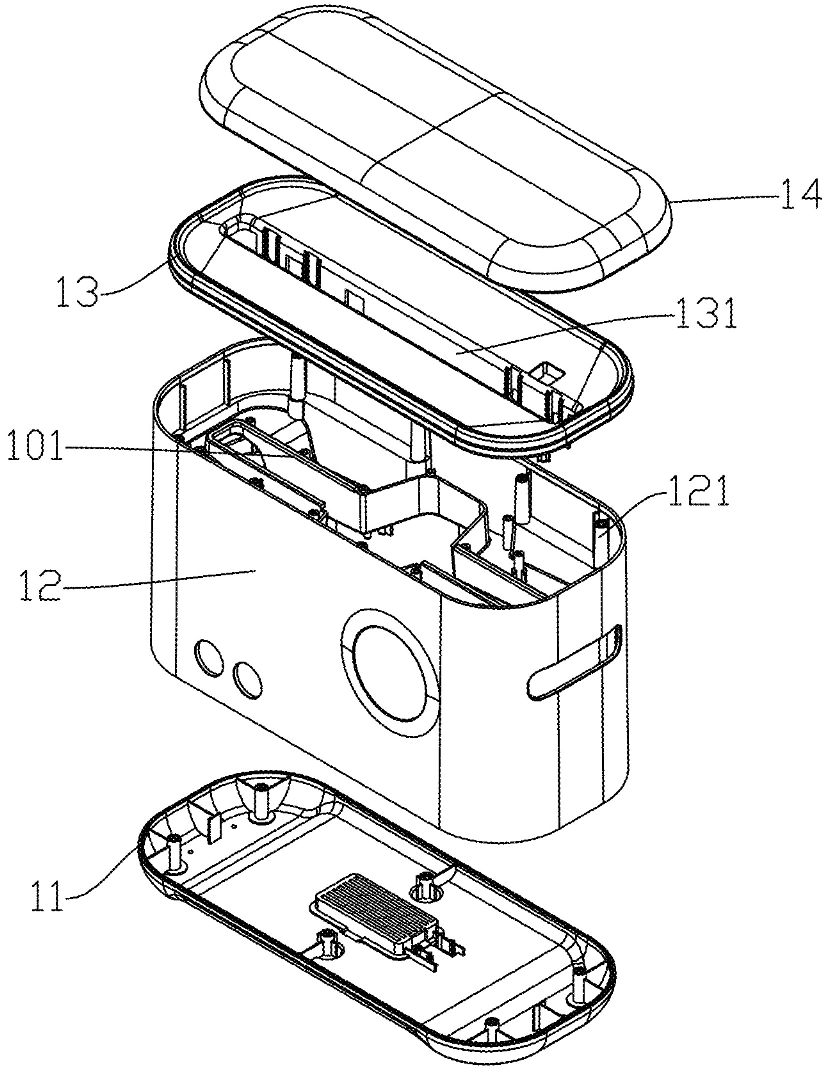
FIG. 8 is an exploded view of the housing according to an embodiment of the present application.

As shown in FIG. 8, in some embodiments, the housing 10 includes a bottom shell 11, a support shell 12, and a top shell 13. The bottom shell 11 is located at a bottom end of the support shell 12, and the top shell 13 is located at a top end of the support shell 12. The bottom shell 11, the support shell 12, and the top shell 13 together form the cavity of the housing 10.

The support plate 101 is located on the support shell 12, and the cleaning container 20 is provided on the support plate 101 in the support shell 12. The support plate 101 is provided with a first support column 121, which is used to support the top shell 13 and is connected to the top shell 13 by screws. The top shell 13 is provided with a receiving hole 131 that is matched with the cleaning tank 21, so that the record can enter the cleaning tank 21 through the receiving hole 131.

In some embodiments, the housing 10 further comprises a transparent cover 14, which is disposed on the top shell 13. The transparent cover 14 is made of transparent material and can cover the top shell 13. When the record cleaning machine 100 is not in use, the transparent cover 14 can effectively isolate impurities such as dust and dirt from external environment, ensuring cleanliness inside the record cleaning machine 100 and extending its service life.

Figure 9:
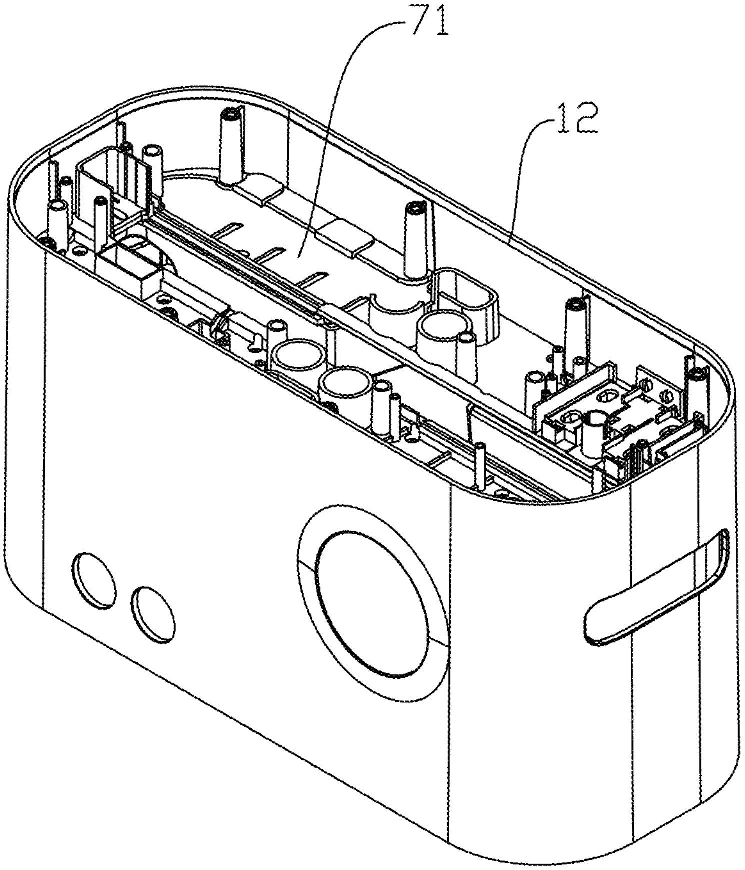
FIG. 9 is a schematic diagram of a first bracket installed on the housing according to an embodiment of the present application.
Figure 10:
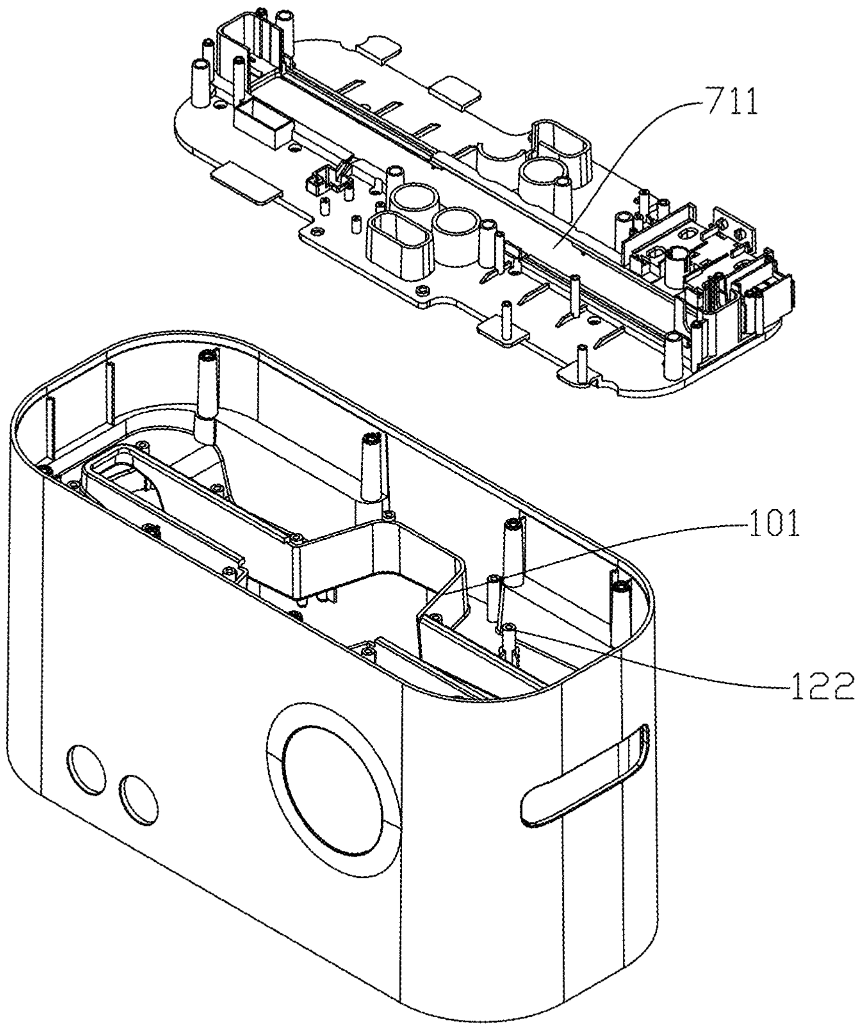
FIG. 10 is a schematic diagram of the first bracket according to an embodiment of the present application.

As shown in FIGS. 9 and 10, the record cleaning machine 100 also comprises a first bracket 71, which is disposed in the housing 10. Optionally, the first bracket 71 is provided on the support plate 101, and is located below the top shell 13. The support plate 101 is provided with a second support column 122, which can support the first bracket 71 and is connected to the first bracket 71 by screws.

The first bracket 71 is provided with a through hole 711, which is matched with the cleaning container 20. The first bracket 71 can press the cleaning container 20 tightly from above. The record can enter the cleaning tank 21 through the through hole 711.

Figure 11:
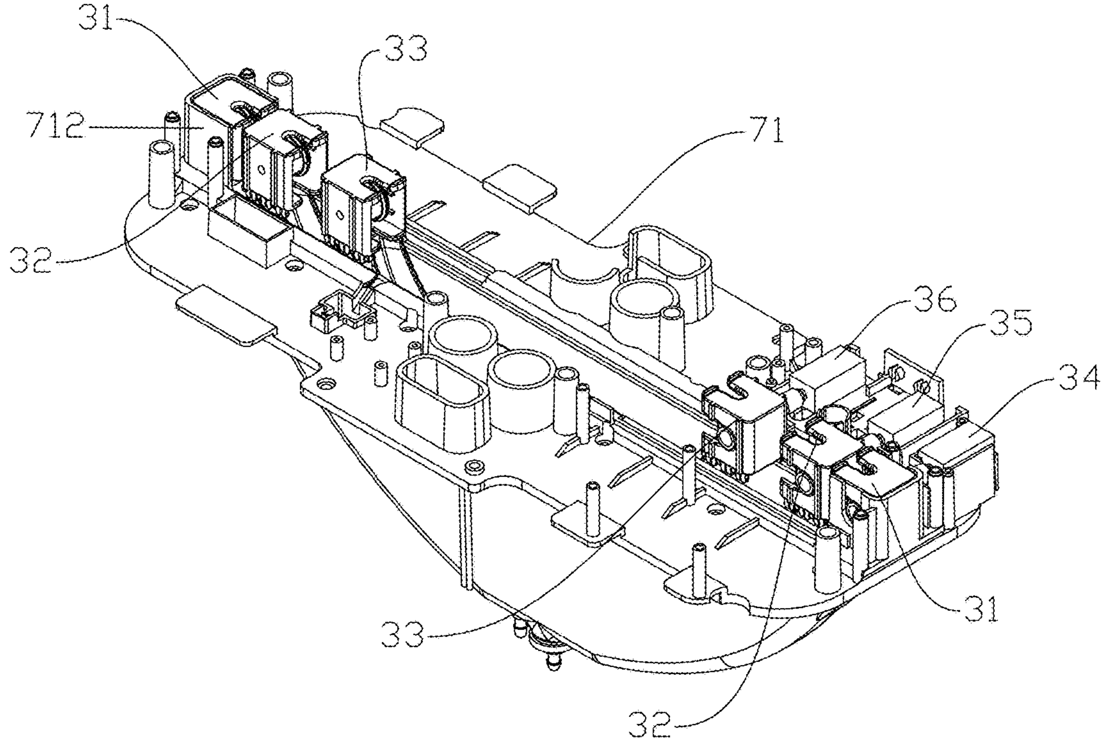
FIG. 11 is a schematic diagram of a support assembly according to an embodiment of the present application.
Figure 12:
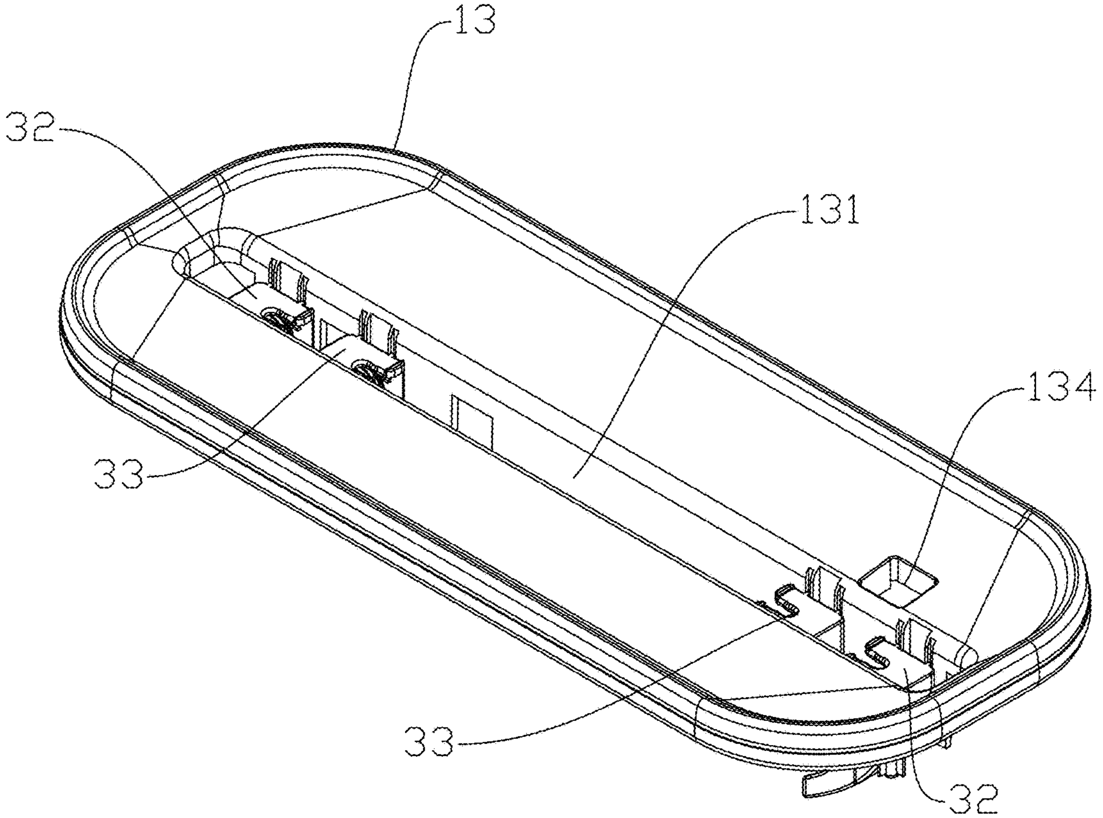
FIG. 12 is a schematic diagram of an adapter installed on a top shell according to an embodiment of the present application.

As shown in FIGS. 11 and 12, in some embodiments, the support assembly 30 includes first adapters 31, second adapters 32, third adapters 33, a first driver 34, a second driver 35, and a third driver 36.

The first adapters 31 are disposed at the first bracket 71, for example, an adapter seat 712 is provided at an end of the first brackets 71, and the first adapters 31 are mounted on the adapter seat 712. There're two first adapters 31, which are installed at both ends of the first bracket 71, respectively. The first adapters 31 can support a first record and drive it to rotate, avoiding the first record from contacting the bottom of the cleaning tank 21. For example, the first record is a record of 12 inches.

Figure 13:
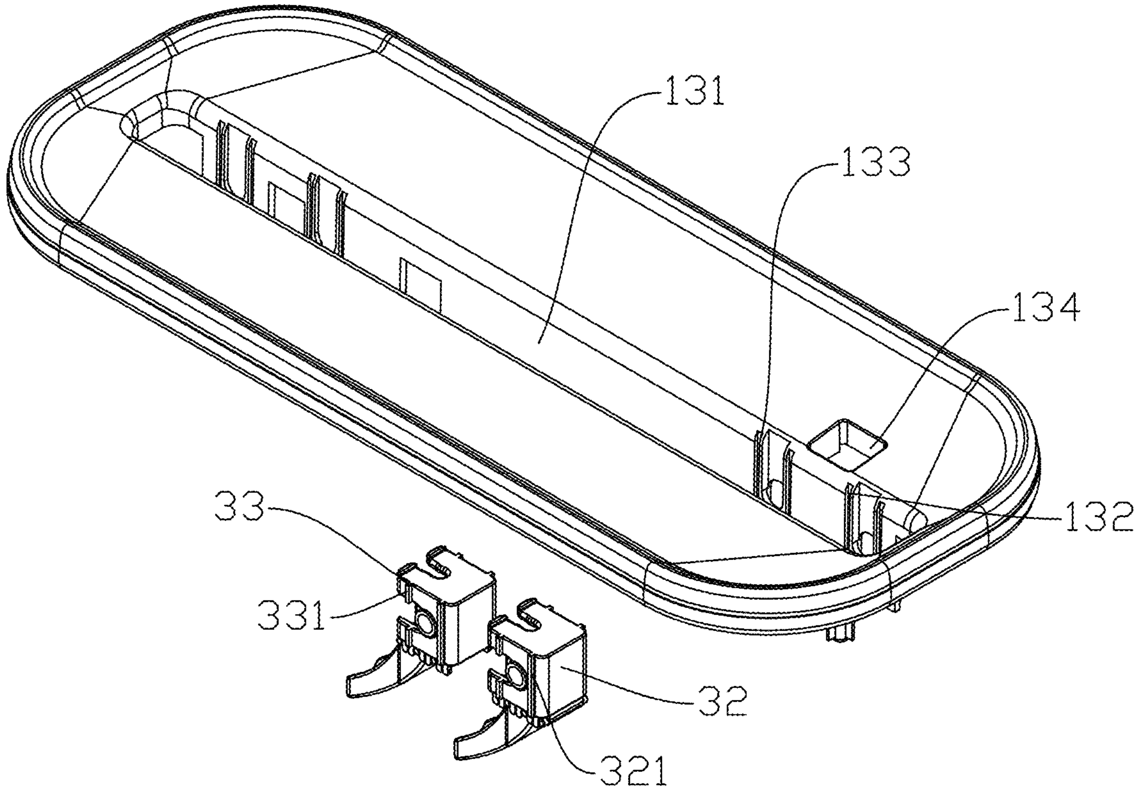
FIG. 13 is a schematic diagram of a connection structure between an adapter and the top shell according to an embodiment of the present application.

As shown in FIG. 13, the second adapters 32 are detachably disposed at the housing 10. Optionally, first sliding grooves 132 extended vertically are provided on two opposite hole walls of the receiving hole 131 of the top shell 13, and a first sliding column 321 matched with the first sliding groove 132 is provided on a side wall of the second adapters 32. The first sliding column 321 slides into the first sliding groove 132, realizing the detachable connection of the second adapters 32 to the top shell 13. The first sliding groove 132 does not extend to the bottom end of the top shell 13, so that the top shell 13 can support the first sliding column 321 to prevent the second adapters 32 from slipping out of the receiving hole 131. The second adapters 32 can support a second record and drive it to rotate, for example, the second record is a record of 10 inches. The second adapters 32 are located near a centerline of the cleaning tank 21 relative to the first adapter 31. There're two second adapters 32, which are disposed relative to each other to support the second record.

The third adapters 33 are detachably disposed at the housing 10. Optionally, second sliding grooves 133 extended vertically are provided on opposite hole walls of the receiving hole 131 of the top shell 13, and a second sliding column 331 matched with the second sliding groove 133 is provided on a side wall of the third adapters 33. The second sliding column 331 slides into the second sliding groove 133, realizing the detachable connection of the third adapters 33 to the top shell 13. The second sliding groove 133 does not extend to the bottom end of the top shell 13, so that the top shell 13 can support the second sliding column 331 to prevent the third adapters 33 from slipping out of the receiving hole 131. The third adapters 33 can support a third record and drive it to rotate, for example, the third record is a record of 7 inches. The third adapters 33 are located near the centerline of the cleaning tank 21 relative to the second adapter 32. There're two third adapters 33, which are disposed relative to each other to support the third record.

As shown in FIG. 11, the first driver 34, the second driver 35, and the third driver 36 are all installed at the first bracket 71. The first driver 34 is connected to the first adapters 31 to drive the first record to rotate. The second driver 35 is detachably connected to the second adapters 32 to drive the second record to rotate. The third drive 36 is detachably connected to the third adapters 33 to drive the third record to rotate. Optionally, the first driver 34, the second driver 35, and the third driver 36 are all motors.

When cleaning records of different specifications, there is no need to disassemble the first adapters 31. When cleaning the first record, the second adapters 32 and the third adapters 33 are removed from the top shell 13, and the first record is inserted into the record cleaning machine 100 for cleaning.

When cleaning the second record, the third adapter 33 is removed from the top shell 13 and the second record is inserted into the record cleaning machine 100 for cleaning. When cleaning the third record, choose whether to remove the second adapter 32 according to needs.

The record cleaning machine 100 of this embodiment includes a plurality of adapters, which are easy to disassemble and assemble. Different adapters can be disassembled and assembled according to different specifications of records to meet the cleaning needs of multiple specifications of records.

Figure 14:
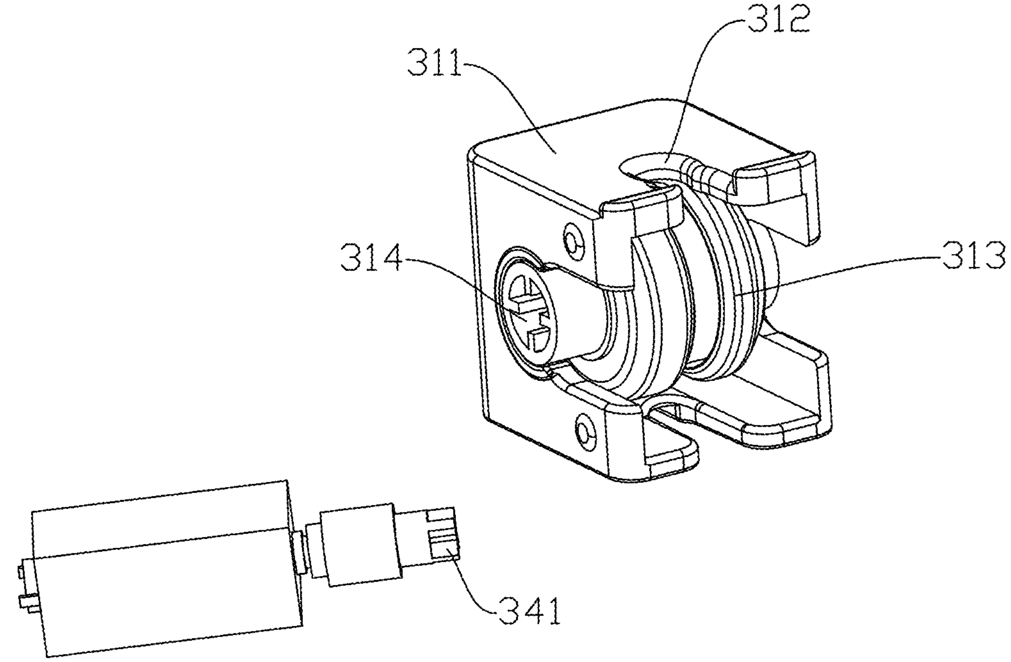
FIG. 14 is a schematic diagram of a first adapter according to an embodiment of the present application.

As shown in FIG. 14, in some embodiments, each of the first adapters 31 include a first roller seat 311 and a first roller 313. The first roller seat 311 is disposed on the adapter seat 712 of the first bracket 71. The first roller 313 is rotatably connected to the first roller seat 311, and is matched with the first record. The first roller seat 311 is provided with a first avoidance groove 312, and the first record enters the first avoidance groove 312 to abut against the first roller 313.

An output terminal 341 of the first driver 34 is in a cross shape, and a side wall of the first roller 313 is provided with a plug hole 314 that is matched with the output terminal 341 of the first driver 34, so that the first driver 34 can drive the first roller 313 to rotate, thereby driving the rotation of the first record.

Figure 15:
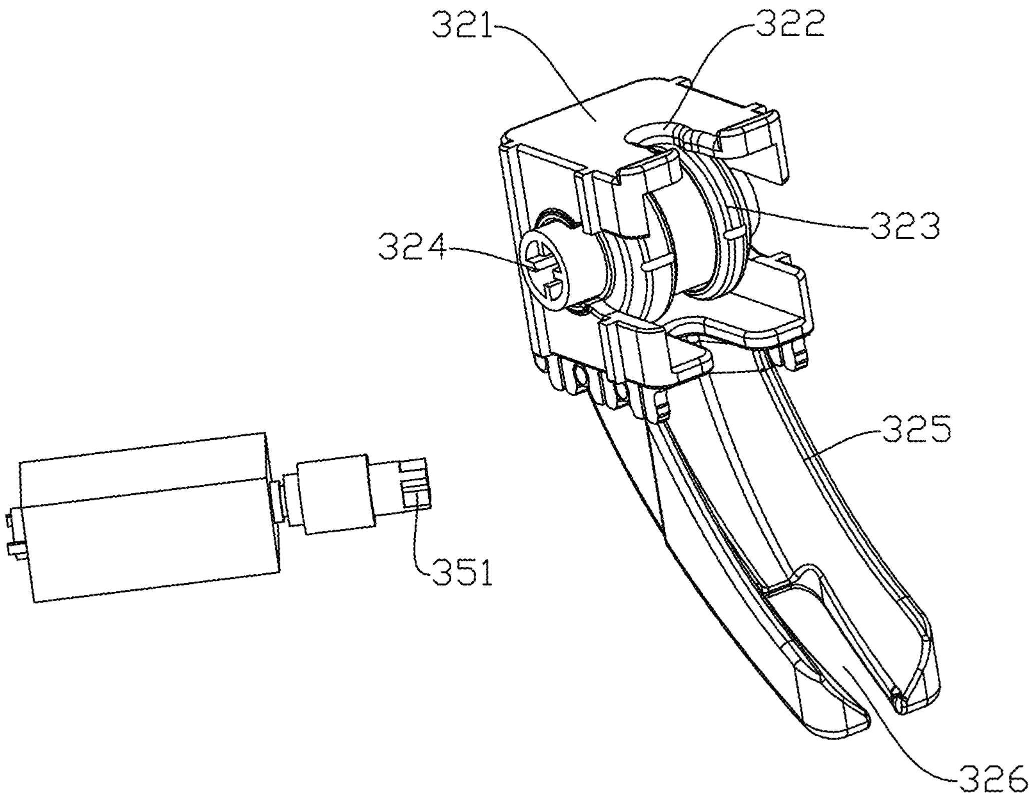
FIG. 15 is a schematic diagram of a second adapter according to an embodiment of the present application.

As shown in FIG. 15, in some embodiments, each of the second adapters 32 include a second roller seat 321, a second roller 323, and a support 325. The second roller seat 321 is detachably disposed at the housing 10, for example, the second roller seat 321 is detachably disposed in the receiving hole 131. The second roller 323 is rotatably connected to the second roller seat 321, and the second roller 323 is matched with the second record. The support 325 is located at a bottom of the second roller seat 321, is in the cleaning tank 21, and is matched with the second record. The second roller seat 321 is provided with a second avoidance groove 322, and the support 325 is provided with a third avoidance groove 326, so that the second record can abut against the second roller 323.

The second roller 323 of at least one of the second adapters 32 is detachably connected to the second drive 35. For example, an output terminal 351 of the second driver 35 is in a cross shape, and a side wall of the second roller 323 is provided with a plug hole 324 that is matched with the output terminal 351 of the second driver 35, so that the second driver 35 can drive the second roller 323 to rotate, thereby driving the second record to rotate. Optionally, there's no need to connect the second adapters 32 of the second driver 35, and there's no need to have a plug hole 324.

The structure of the third adapters 33 is the same as that of the second adapters 32. The second roller 323 of at least one of the third adapters 33 is detachably connected to the third driver 36. The support 325 of the third adapters 36 is matched with the third record.

Figure 16:
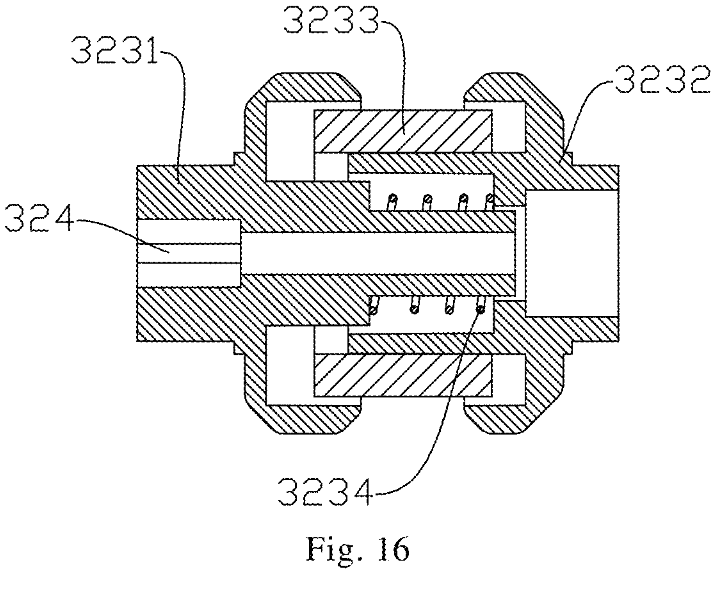
FIG. 16 is a sectional view of a second roller according to an embodiment of the present application.
Figure 17:
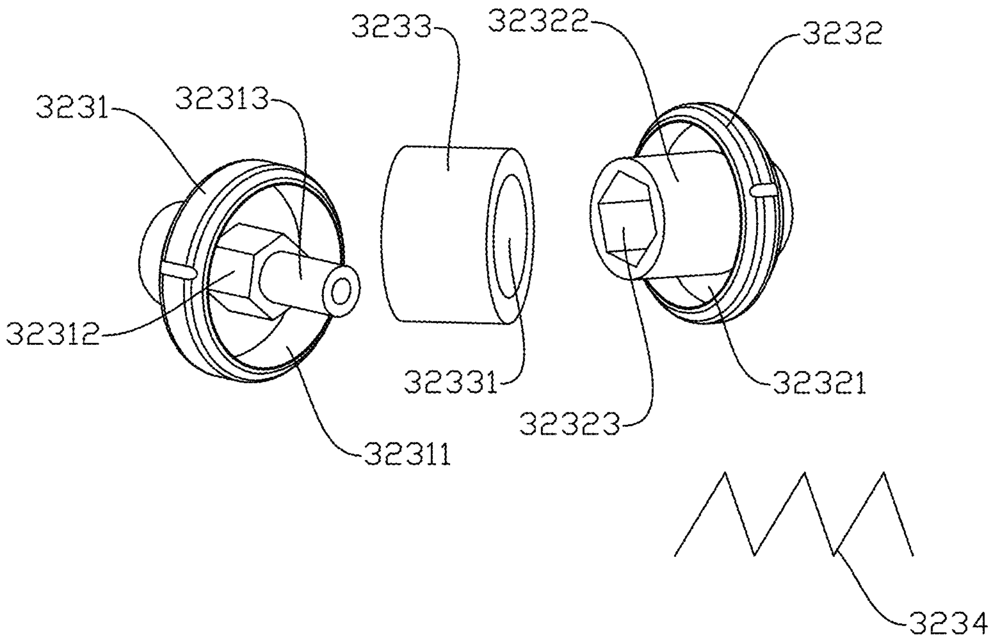
FIG. 17 is an exploded view of a second roller according to an embodiment of the present application.

As shown in FIGS. 16 and 17, the second roller 323 includes a first wheel body 3231, a second wheel body 3232, a third wheel body 3233, and a first elastic 3234.

A left end surface of the first wheel body 3231 is provided with the plug hole 324, and a right end surface of the first wheel body 3231 is provided with a first groove 32311. A groove bottom of the first groove 32311 is provided with a sliding column 32312, which can optionally be a polygonal column. An end surface of the sliding column 32312 is provided with a cylinder 32313.

A left end surface of the second wheel body 3232 is provided with a second groove 32321, and a groove bottom of the second groove 32321 is provided with a support column 32322. The support column 32322 is provided with a sliding hole 32323, which is matched with the sliding column 32312.

The left end surface of the first wheel body 3231 is provided with a rotating shaft, which is disposed on a side wall of the second roller seat 321. The right end of the second wheel body 3232 is provided with a rotating shaft, which is disposed on another side wall of the second roller seat 321. The sliding column 32312 is configured to slide in the sliding hole 32323.

The third wheel 3233 is positioned between the first wheel 3231 and the second wheel 3232. For example, the third wheel body 3233 is equipped with a through hole 32331, which is matched with the support column 32322. The third wheel body 3233 is sleeved on the outside of the support column 32322.

The first elastic 3234 is positioned between the first wheel body 3231 and the second wheel body 3232. For example, the first elastic 3234 is a spring, which is sleeved on the outside of the cylinder 32313. An end of the spring abuts against the end surface of the sliding column 32312, and another end of the spring abuts against the bottom of the second groove 32321. The first elastic 3234 can push the first wheel body 3231 and the second wheel body 3232 away from each other.

Taking the second adapters 32 as an example, they are installed on the top shell 13. The output end 351 of the second driver 35 is connected to the plug hole 324, and the second driver 35 can drive the second roller 323 to rotate. When it is necessary to remove the second adapter 32 from the top shell 13, the first wheel body 3231 is pressed with a special tool to be slid in a direction close to the second wheel body 3232. The first elastic 3234 is compressed, and the plug hole 324 is disconnected from the output end 351 of the second driver 35, so as to remove the second adapter 32. After removing the second adapter 32, the first elastic 3234 pushes the first wheel body 3231 back to its original position.

Figure 18:
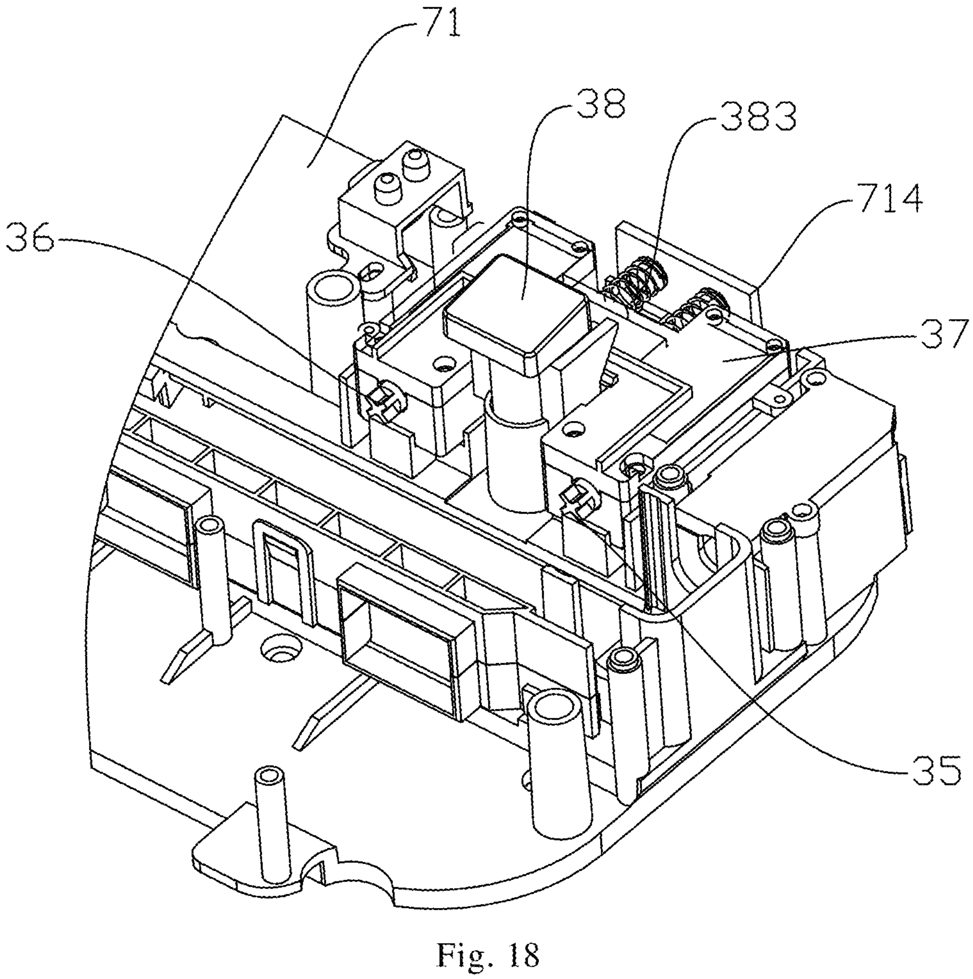
FIG. 18 is a schematic diagram of a slider, a first button, and a second elastic according to an embodiment of the present application.
Figure 19:
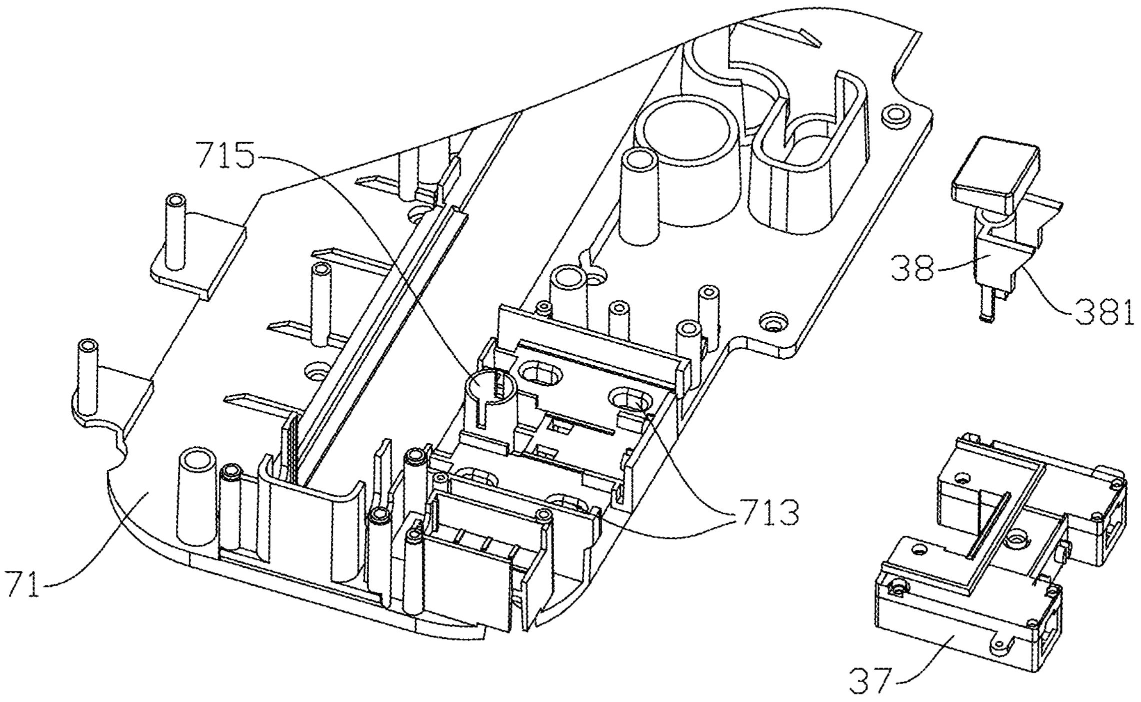
FIG. 19 is a schematic diagram of the first bracket, the slider, and the first button according to an embodiment of the present application.

As shown in FIGS. 18 and 19, in some embodiments, the support assembly 30 further comprises a slider 37, a first button 38, and a second elastic 383.

Figure 20:
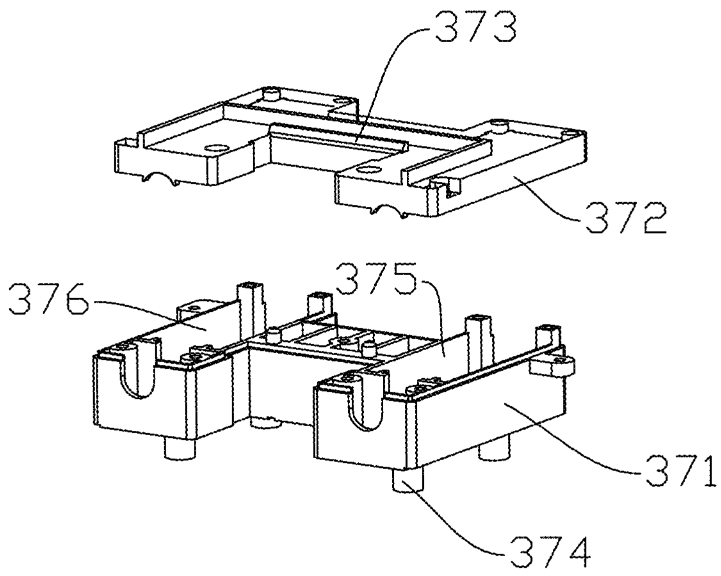
FIG. 20 is an exploded view of the slider according to an embodiment of the present application.
Figure 21:
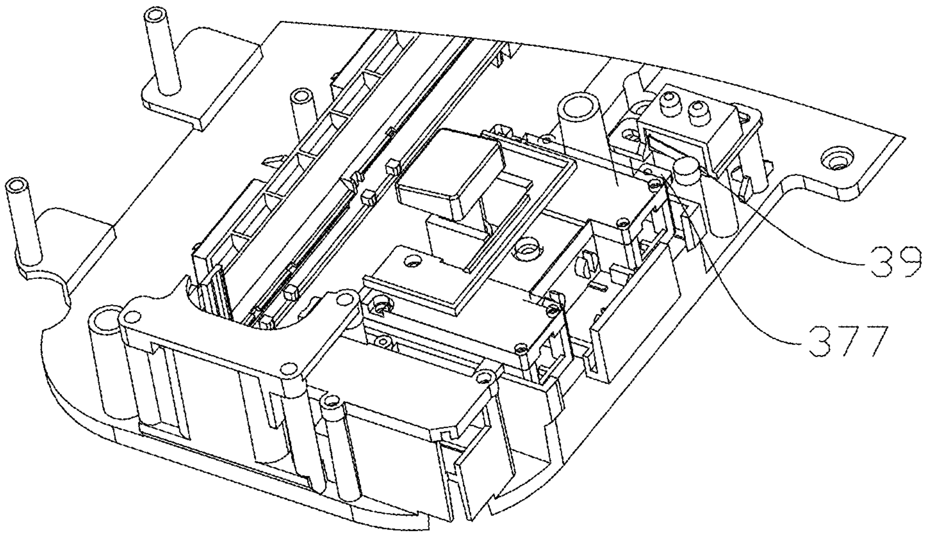
FIG. 21 is a schematic diagram of a first stroke switch according to an embodiment of the present application.

As shown in FIGS. 19, 20 and 21 the slider 37 is configured to slide on the first bracket 71, and the second driver 35 and the third driver 36 are both disposed at the slider 37. For example, the slider 37 includes a slider body 371 and a slider cover 372. A bottom end of the slider body 371 is provided with a plurality of guide columns 374, and the first bracket 71 is provided with guide holes 713 that are matched with the guide columns 374, so that the slider body 371 can slide on the first bracket 71. The slider body 371 is provided with a first driver groove 375 and a second driver groove 376. The second driver 35 is installed in the first driver groove 375, and the third driver 36 is installed in the second driver groove 376. The slider cover 372 is connected to the slider body 371 by screws, and the slider cover 372 presses the second driver 35 and the third driver 36 tightly from above. The side wall of the slider cover 372 is provided with a first inclined surface 373. The output terminals of the second driver 35 and the third driver 36 both extend from the slider 37.

The first button 38 is disposed at the first bracket 71, for example, the first bracket 71 is provided with a sliding hole 715 that is matched with the first button 38, so that the first button 38 can slide up and down relative to the first bracket 71. The side wall of the first button 38 is provided with a second inclined surface that is matched with the first inclined surface 373. Pressing the first button 38 can push the slider 37 to slide away from the cleaning tank 21.

The second elastic 383 is positioned between the slider 37 and the first bracket 71. For example, an edge of the first bracket 71 is provided with a baffle 714, the second elastic 383 is a spring, one end of the second elastic 383 abuts against the slider 37, and the other end of the second elastic 383 abuts against the baffle 714. The second elastic 383 can push the slider 37 to slide in a direction closer to the cleaning tank 21.

As shown in FIG. 12, the top shell 13 is provided with a through hole 134 that is matched with the first button 38, and a top of the first button 38 is located in the through hole 134.

When installing the second adapters 32 or the third adapters 33 onto the top shell 13, the first button 38 is pressed to push the slider 37 to slide away from the cleaning tank 21. The second elastic 383 is compressed, and the second driver 35 and the third driver 36 is slid along with the slider 37, making it easier to install the second adapter 32 or the third adapter 33 on the top shell 13. After the pressure of pressing the first button 38 disappears, the second elastic 383 pushes the slider 37 to reset.

As shown in FIG. 21, in some embodiments, the support assembly 30 further includes a first stroke switch 39, which is provided on the first bracket 71. A contact plate 377 is provided on a side wall of slider 37, and can abut against the first stroke switch 39. The stroke switch 39 is connected with the control system 60.

The first button 38 is pressed to push the slider 37 to slide away from the cleaning tank 21. The contact plate 377 can abut against the first stroke switch 39, which sends the contact signal to the control system 60.

In an embodiment, when the record cleaning machine 100 is running, the first button 38 is pressed for a short period of time. Based on the signal from the first stroke switch 39, the control system 60 controls the record cleaning machine 100 to pause operation. After the first button 38 is briefly pressed again, the control system 60 controls the record cleaning machine 100 to continue running according to the signal from the first stroke switch 39.

Figure 22:
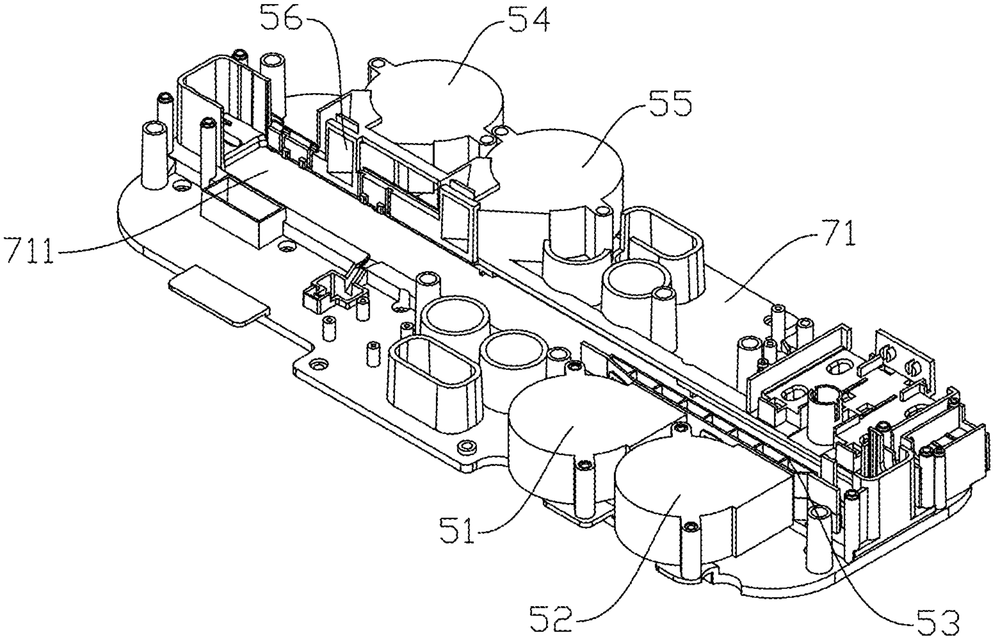
FIG. 22 is a schematic diagram of an air drying system according to an embodiment of the present application.

As shown in FIG. 22, in some embodiments, the air drying system 50 includes a first fan 51, a second fan 52 and a first air outlet piece 53, and all of which are mounted on the first bracket 71.

Figure 23:
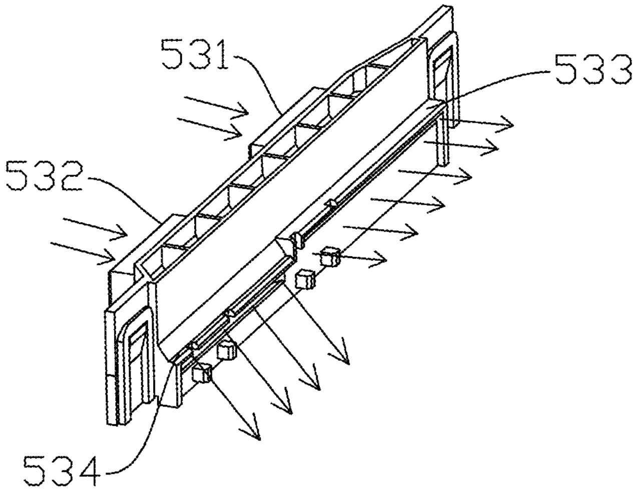
FIG. 23 is a schematic diagram of a first air outlet piece according to an embodiment of the present application.

As shown in FIG. 23, the first air outlet piece 53 is provided with a first air inlet 531, a second air inlet 532, a first air outlet 533, and a second air outlet 534. The first air inlet 531 is connected to the first air outlet 533, and the second air inlet 532 is connected to the second air outlet 534. The first air outlet 533 and the second air outlet 534 both face the record. The first fan 51 is connected to the first air inlet 531, and the first air outlet 533 blows out airflow generated by the first fan 51 in a horizontal or inclined upward direction. The second fan 52 is connected to the second air inlet 532, and the second air outlet 534 blows out airflow generated by the second fan 52 in an inclined downward direction. The arrows in FIG. 23 indicate the direction of airflow.

The airflow directions blown out from the first air outlet 533 and the second air outlet 534 are different, forming a circulating airflow, which can blow more evenly towards the record, so that all positions on the surface of the record can be effectively dried. Compared to one-way blowing, the circulating airflow can quickly remove the moisture on the surface of the record, thereby accelerating the air drying speed and improving the air drying efficiency.

In some embodiments, the air drying system 50 further comprises a third fan 54, a fourth fan 55 and a second air outlet piece 56, all of which are mounted on the first bracket 71.

Figure 24:
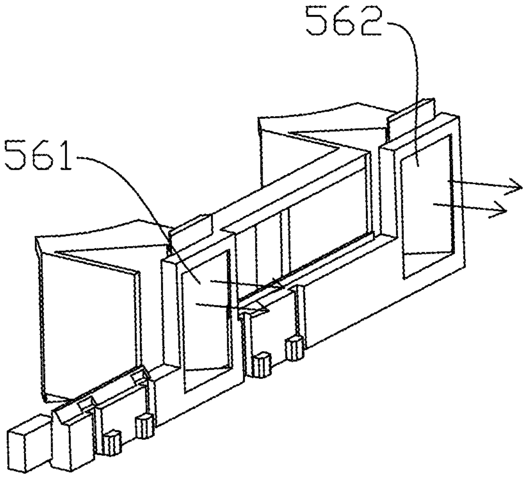
FIG. 24 is a schematic diagram of a second air outlet piece according to an embodiment of the present application.

As shown in FIG. 24, the second air outlet piece 56 is provided with a third air outlet 561 and a fourth air outlet 562, both of which face the record. The third fan 54 is connected to the third air outlet 561, which blows out airflow generated by the third fan 54 in a horizontal direction. The fourth fan 55 is connected to the fourth air outlet 562, which blows out airflow generated by the fourth fan 55 in a horizontal direction. The third fan 54 and the fourth fan 55 is set to further improve the air drying efficiency. The arrows in FIG. 23 indicate the direction of airflow.

Optionally, the blowing direction of the third air outlet 561 and the fourth air outlet 562 are both inclined towards the edge of the record (that is away from the center of the record).

In some embodiments, the first air outlet piece 53 is located on a side of the cleaning tank 21, and the second air outlet piece 56 is located on another side of the cleaning tank 21. The first air outlet piece 53 and the second air outlet piece 56 are diagonally disposed to facilitate air drying of the record.

Figure 25:
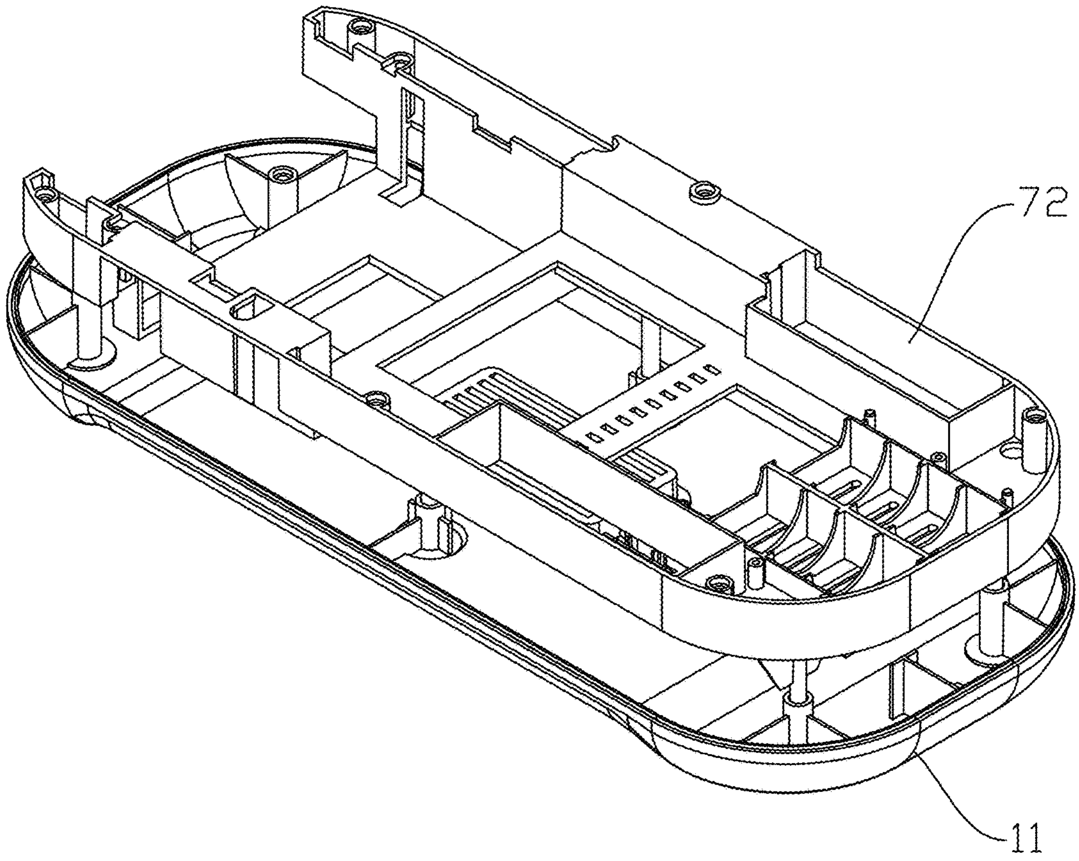
FIG. 25 is a schematic diagram of a second bracket and a bottom shell according to an embodiment of the present application.

As shown in FIG. 25, in some embodiments, the record cleaning machine 100 further includes a second bracket 72, which is disposed in a cavity of a housing 10. For example, the second bracket 72 is connected to a bottom shell 11 by screws, and is located inside a support shell 12. The water supply system 40 is installed on the second bracket 72.

Figure 26:
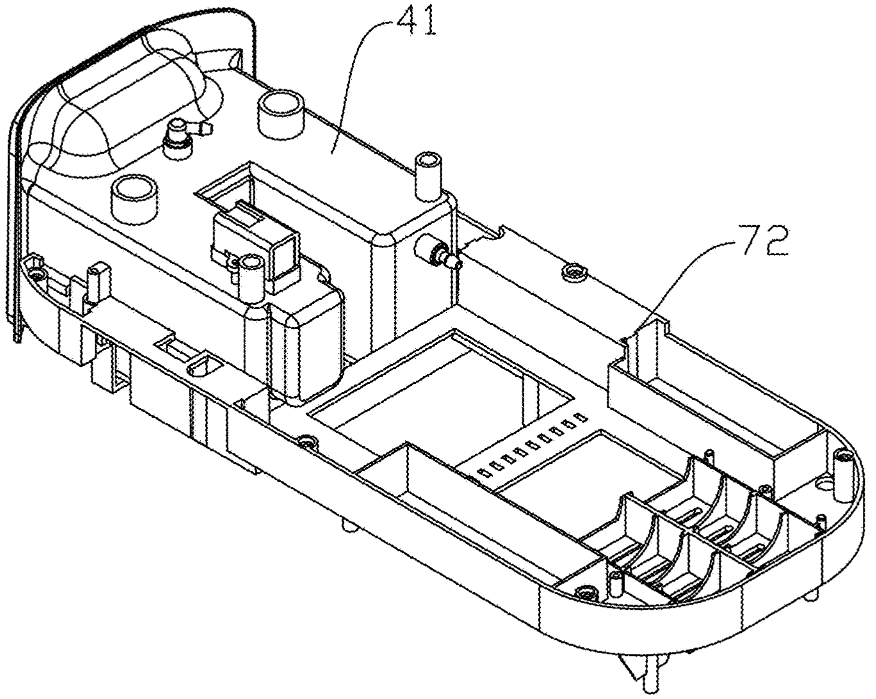
FIG. 26 is a schematic diagram of a second bracket and a water storage box according to an embodiment of the present application.
Figure 27:
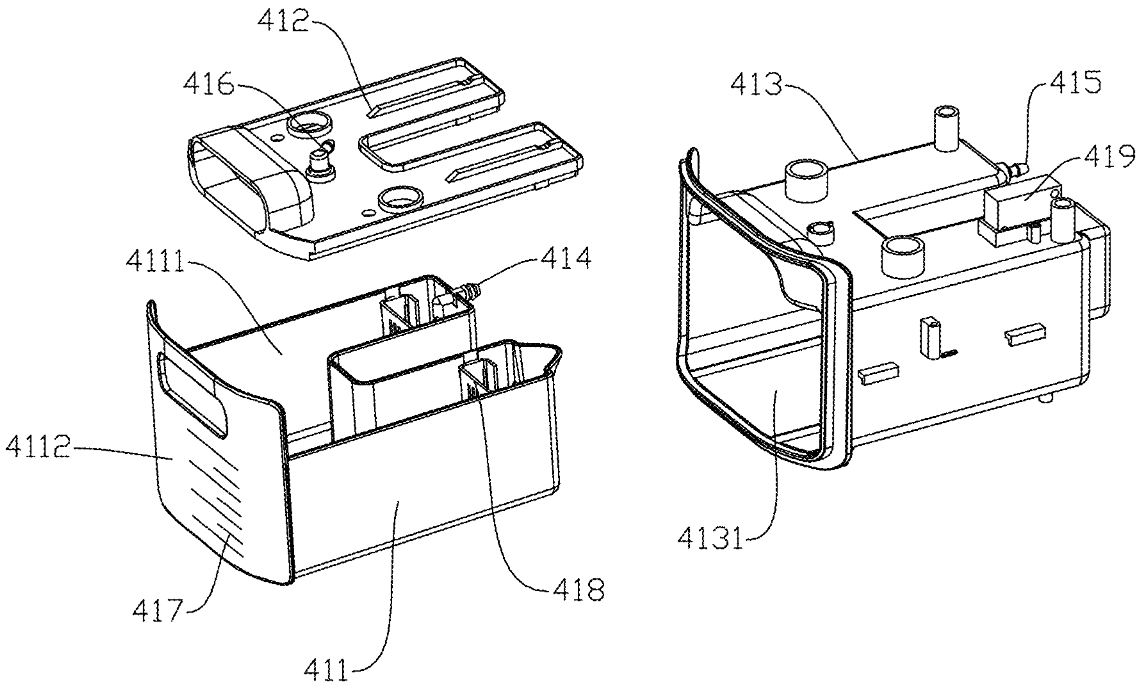
FIG. 27 is an exploded view of the water storage box according to an embodiment of the present application.

As shown in FIGS. 26 and 27, in some embodiments, the water storage box 41 includes a box body 411, a water storage box shell 412, and a water storage box outer cover 413. The water storage box outer cover 413 is disposed on a top surface of the second bracket 72. The water storage box outer cover 413 is provided with a receiving chamber 4131 that has an opening at an end, and the box body 411 and the water storage box shell 412 can slide into the receiving chamber 4131. The box body 411 is provided with a water storage chamber 4111 that has an opening at a top, and the first pump 42 and the second pump 43 can be communicated with the water storage chamber 4111 respectively. The water storage box shell 412 is used to close the top opening of the water storage chamber 4111, preventing external dust from entering the water storage chamber 4111. After adding an appropriate amount of water to the water storage chamber 4111, the water storage box shell 412 is placed on top of the box body 411, and the box body 411 is pushed into the water storage box outer cover 413. The support shell 12 is provided with mounting holes that are matched with the water storage box outer cover 413.

Optionally, the box body 411 is provided with a first water outlet joint 414, and the water storage box outer cover 413 is provided with a second water outlet joint 415. After the box body 411 enters the water storage box outer cover 413, the first water outlet joint 414 is connected to the second water outlet joint 415, which is used to connect the first pump 42. The water storage box shell 412 is provided with an inlet joint 416, which is connected to the water storage chamber 4111, and the second pump 43 is connected to the inlet joint 416. After the box body 411 enters the water storage box outer cover 413, a side wall 4112 of the box body 411 away from the cleaning container 20 is roughly flush with the side wall of the housing 10.

In some embodiments, a side wall 4112 of the box body 411 away from the cleaning container 20 is made of transparent material, and a water level gauge 417 is provided on the transparent side wall 4112. The transparent side wall 4112 facilitates observation of the water volume in the storage chamber 4111. Optionally, the box body 411, the water storage box shell 412, and the water storage box outer cover 413 are all made of transparent materials.

In some embodiments, the water storage box 41 further includes a first filter 418, which is disposed in the water storage chamber 4111 of the box body 411. The first filter 418 is provided with filter cotton for filtering the water output from the water storage box 41. Optionally, the first filter 418 is located near the first outlet joint 414.

As shown in FIG. 3, in some embodiments, the water supply system 40 further includes a temperature sensor 45 and a water level gauge 46. The temperature sensor 45 is installed on the side wall of the cleaning container 20 to detect water temperature in the cleaning tank 21. The water level gauge 46 is used to detect water level in the cleaning tank 21. The temperature sensor 45 and the water level gauge 46 are both connected to the control system 60. Optionally, the record cleaning machine 100 also includes a buzzer. If the control system 60 determines that the water temperature in the cleaning tank 21 exceeds the preset value based on the signal from the temperature sensor 45, the control system 60 controls the buzzer to sound an alarm. The control system 60 determines the amount of water added to the cleaning tank 21 based on the signal from the water level gauge 46.

Optionally, as shown in FIG. 27, a second stroke switch 419 is provided at a top of the water storage box outer cover 413, which extends into the receiving chamber 4131. After the box body 411 and the water storage box shell 412 slide into the receiving chamber 4131, the second stroke switch 419 can be triggered. The second stroke switch 419 is connected to the control system 60. If the box body 411 and the water storage box shell 412 are not installed properly, when the record cleaning machine 100 is started, and the control system 60 will control the buzzer to sound an alarm.

Figure 28:
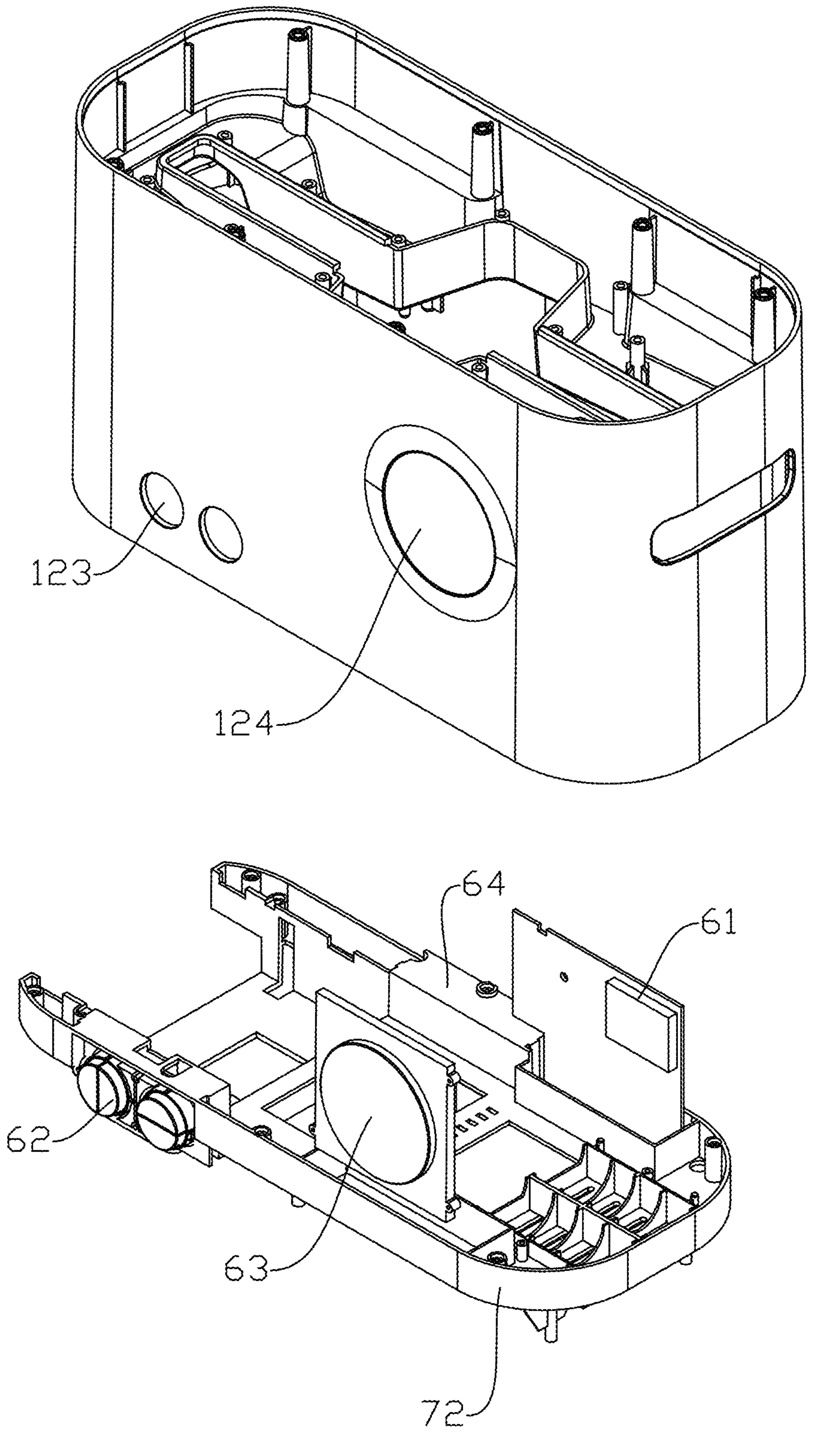
FIG. 28 is a schematic diagram of a control system according to an embodiment of the present application.

As shown in FIG. 28, in some embodiments, the control system 60 includes a circuit board 61, a second button 62, a screen 63, and a power assembly 64. The circuit board 61 is disposed inside the housing 10, for example, the circuit board 61 is disposed on an inner wall of the support shell 12. The support assembly 30, the water supply system 40, the air drying system 50, the ultrasonic generator 83, the first stroke switch 39, and the second stroke switch 419 are all connected to the circuit board 61.

Figure 29:
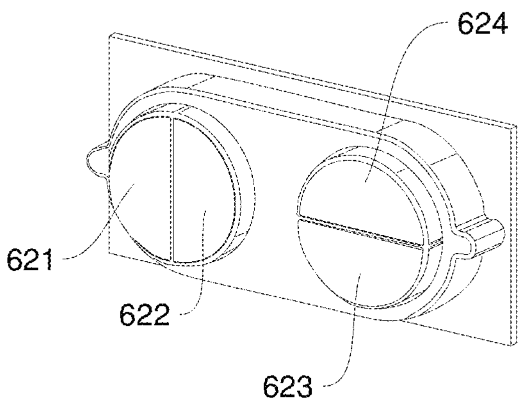
FIG. 29 is a schematic diagram of a second button according to an embodiment of the present application.

As shown in FIG. 29, the second button 62 is connected to the circuit board 61 and is located on the second bracket 72. The second button 62 includes multiple sub keys 621, 622, 623, 624, at least one of which is used to confirm the current operation, and at least another sub key is used to cancel the current operation. For example, the first sub key 621 is the "OK" key used to confirm the current operation. The second sub key 622 is the 'return' key, used to cancel the current operation. The support shell 12 is provided with mounting holes 123 that are matched with the second button 62.

The screen 63 is installed at the housing 10, for example, the support shell 12 is provided with mounting holes 124 that are matched with the screen 63. The screen 63 is connected to the circuit board 61 for displaying information and improving the intelligence of the record cleaning machine. The third sub key 623 is the "up" key used to scroll up or select the previous option in a menu or option list. The fourth sub key 624 is the 'down' key used to scroll down or select the next option in the menu or option list. When an operation menu is displayed on screen 63, the options in the menu is selected by pressing the first sub key 621, the second sub key 622, the third sub key 623, or the fourth sub key 624.

Figure 30:
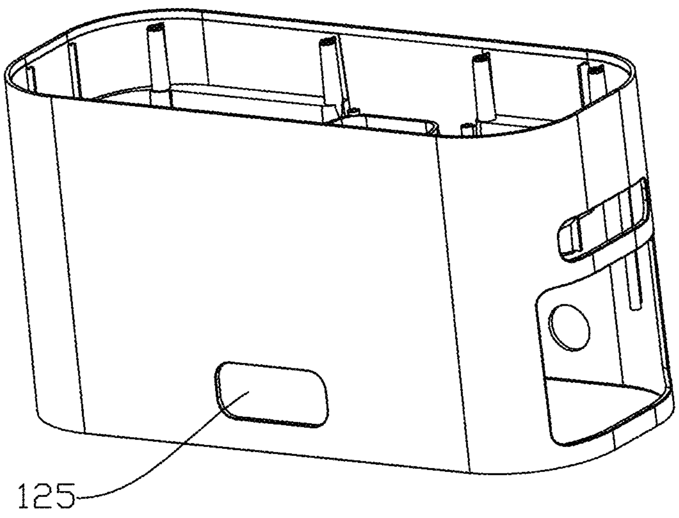
FIG. 30 is a schematic diagram of a support shell according to an embodiment of the present application.

As shown in FIGS. 28 and 30, the power assembly 64 is mounted on the second bracket 72, and the support shell 12 is provided with mounting holes 125 that are matched with the power assembly 64. The power assembly 64 is connected to the circuit board 61 for supplying power to the circuit board 61.

Figure 31:
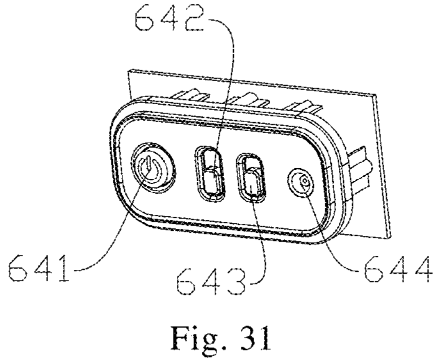
FIG. 31 is a schematic diagram of a power assembly according to an embodiment of the present application.

As shown in FIG. 31, in some embodiments, the power assembly 64 includes a power switch 641, a child lock switch 642, and a gear selection switch 643. The power switch 641, the child lock switch 642, and the gear selection switch 643 are all connected to the circuit board 61.

The power switch 641 is used to control the on or off of the record cleaning machine 100, thus reducing the insertion and removal of power wires. The child lock switch 642 prevents children from operating it without permission. For example, after the child lock switch 642 is locked, all buttons except for the power assembly 64 cannot be operated. The gear selection switch 643 is used to select the working mode. For example, different working modes are set according to different sizes of records, and the working mode can be selected through the gear selection switch 643.

The power assembly 64 also includes a power input interface 644, which is used to connect power wires.

Figure 32:
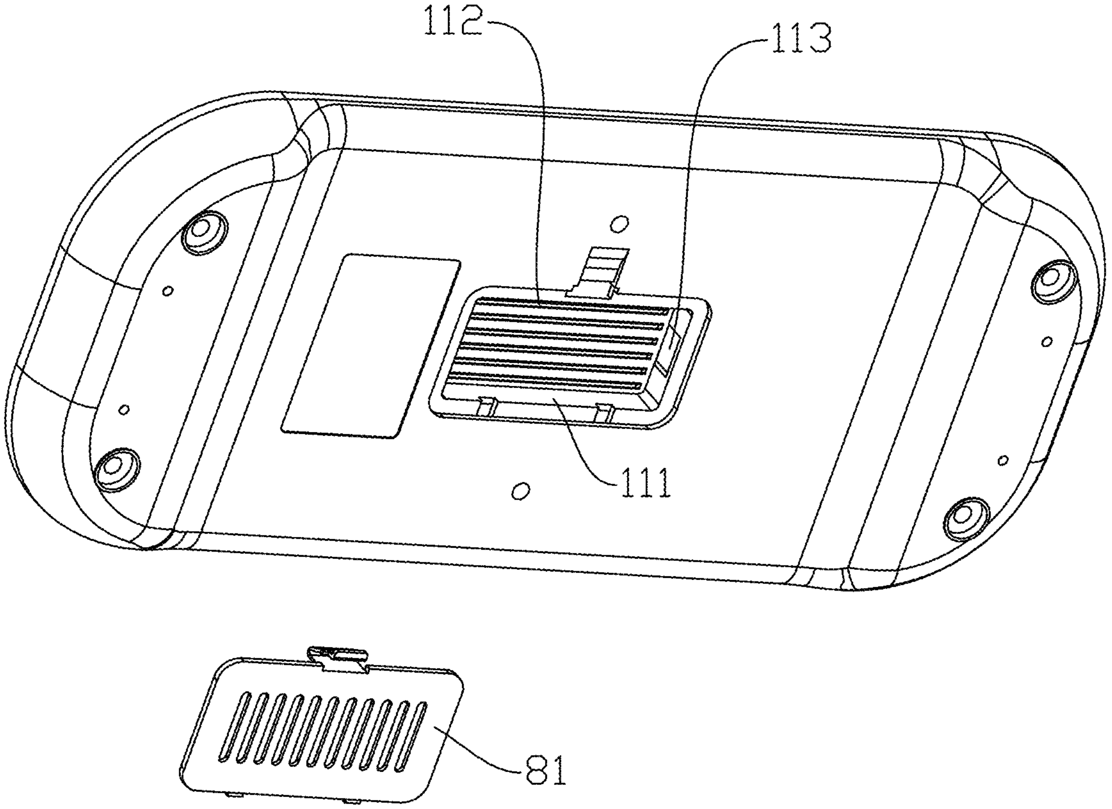
FIG. 32 is a schematic diagram of a second filter according to an embodiment of the present application.

As shown in FIG. 32, in some embodiments, a filter groove 111 is provided at a bottom of the bottom shell 11 of the housing 10, and an air inlet 112 is provided at a bottom of the filter groove 111. The record cleaning machine 100 also includes a second filter 81, which is disposed in the filtering tank 111. The second filter 81 is provided with filter cotton for filtering the air entering the housing 10.

Figure 33:
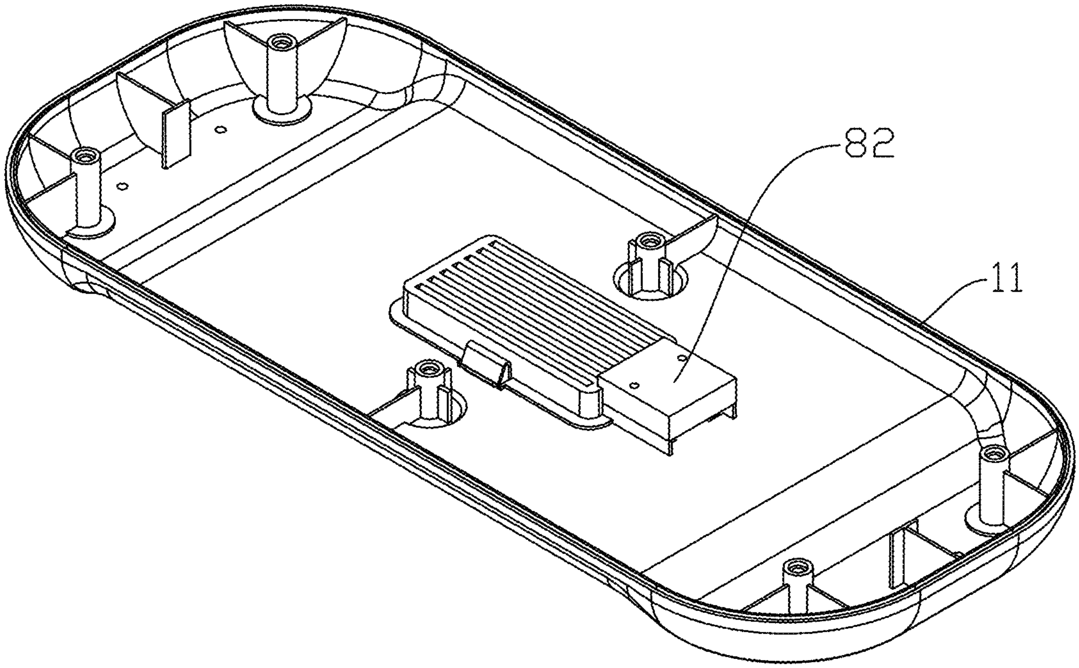
FIG. 33 is a schematic diagram of a USB connector according to an embodiment of the present application.

As shown in FIG. 33, in some embodiments, the record cleaning machine 100 further includes a USB connector 82, which is connected to the circuit board 61. The USB connector 82 is located on a top surface of the bottom shell 11. An inner wall of the filter groove 111 is provided with a plug hole 113 that is matched with the USB connector 82. The system of the record cleaning machine 100 can be updated or upgraded through the USB connector 82. The USB connector 82 is hided on the wall of filter groove 111 to reduce the possibility of damage to the USB connector 82.

As shown in FIG. 1, in some embodiments, the record cleaning machine 100 further includes a handle 84, which is provided on the housing 10. For example, the handle 84 is embedded in the support shell 12, thus making it easy to move the record cleaning machine 100.

Figure 34:
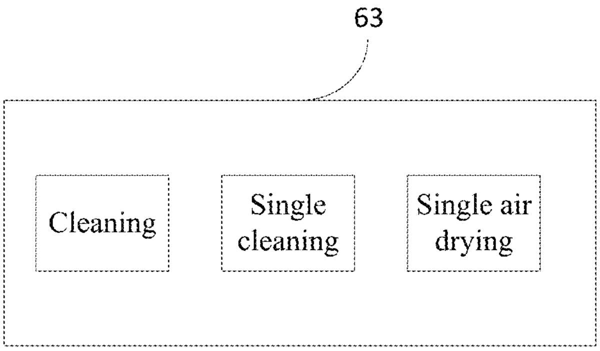
FIG. 34 is a schematic diagram of a screen displaying multiple modes according to an embodiment of the present application.
Figure 35:
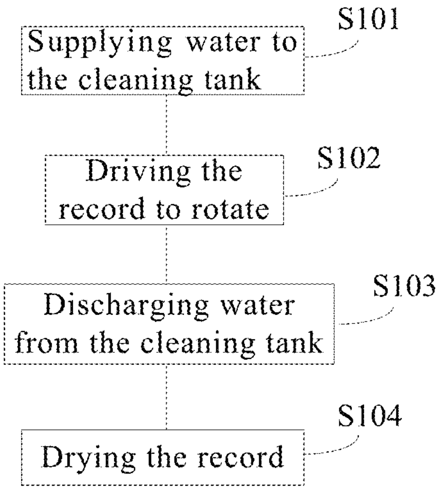
FIG. 35 is a flowchart of a control method in a cleaning mode according to an embodiment of the present application.

As shown in FIGS. 34 and 35, the embodiments of the present application provide a control method for the above-mentioned record cleaning machine 100, which has a cleaning mode. In the cleaning mode, the method comprises:

- S101: activating the first pump 42 to supply water to the cleaning tank 21, and stopping supplying water when the water level in the cleaning tank 21 reaches a preset value;
- S102: driving the record in the cleaning tank 21 to rotate within a first preset time, and activating the ultrasonic generator 83 to clean the record;
- S103: activating the second pump 43 to discharge the water from the cleaning tank 21, and transporting the water to the water storage box 41; and
- S104: activating the air drying system 50 to dry the record.

The preset value of the water level in the cleaning tank 21 and the first preset time of rotation of the record can be adjusted in the cleaning modes. For example, the cleaning mode includes a quick cleaning sub-mode, a mid-range cleaning sub-mode, and a deep cleaning sub-mode. The mode can be selected on the screen 63 through the second button.

The process of the quick cleaning sub-mode includes:

Select "Quick Cleaning" by pressing the third sub key 623 and the fourth sub key 624 in a startup screen of the screen 63 displayed after powering on the record cleaning machine 100.

Figure 36:
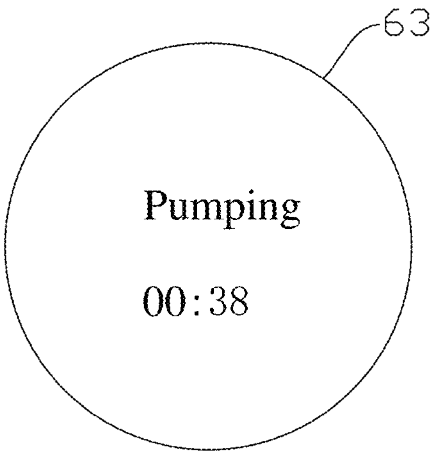
FIG. 36 is a schematic diagram of a screen during operation of the first pump according to an embodiment of the present application.

Next, the first pump 42 starts to work, and a pumping picture is displayed in the screen 63, as shown in FIG. 36. The screen 63 displays "Pumping", and the countdown starts at the same time, for example, the countdown is 38 seconds. The first pump 42 delivers the water in the water storage box 41 to the cleaning tank 21. After completing the pumping, the countdown ends. Optionally, the screen 63 also displays a colored countdown progress bar.

Then, the screen 63 displays "Cleaning . . . ", and the countdown starts, for example, 2 minutes. The motor of the support assembly 30 start to work, and the roller rotates to drive the record to be cleaned to fully contact the water in the cleaning tank 21. The ultrasonic generator 83 begins to vibrate, utilizing the cavitation, acceleration, and direct flow effects of ultrasonic waves in the liquid to disperse, emulsify, and peel off the dirt layer on the record, thus achieving the purpose of cleaning. Countdown is over, cleaning is completed.

Then, the second pump 43 starts to discharge the cleaning tank 21. The screen 63 displays "Drainage . . . ", and the countdown starts, for example, the countdown is 30 seconds. The countdown ends and the drainage is completed.

Then, the fan of the air drying system 50 starts to work, and the screen 63 displays "Drying . . . ". The countdown starts, for example, the countdown is 5 minutes. Countdown is over, drying is completed.

Last, the buzzer emits a "beep, beep" sound, indicating that the quick cleaning sub-mode is completed and the record cleaning is finished. The screen 63 displays "Completed".

The difference between the mid-range cleaning sub-mode and the aforementioned quick cleaning sub-mode is that the cleaning time for the mid-range cleaning sub-mode is 4 minutes.

The difference between the deep cleaning sub-mode and the aforementioned quick cleaning sub-mode is that the cleaning time for the deep cleaning sub-mode is 6 minutes, and the air drying time thereof is 10 minutes.

The cleaning mode also includes a custom sub-mode, which allows for the selection of cleaning time (the first preset time) and air drying time. For example, the cleaning time can be 2 minutes, 4 minutes, or 6 minutes, and the air drying time can be 5 minutes or 10 minutes.

In the custom sub-mode, the cleaning time and the air drying time set during the previous run can be selected.

Figure 37:
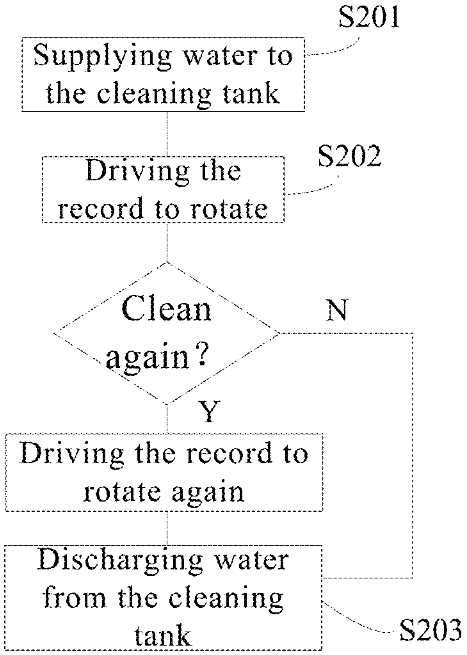
FIG. 37 is a flowchart of a control method in a cleaning only mode according to an embodiment of the present application.

As shown in FIGS. 34 and 37, in some embodiments, the record cleaning machine 100 also has a cleaning only mode. In one embodiment, the operating steps of the cleaning only mode are the same as steps S101, S102, and S103 described above. In the cleaning only mode, the control method includes:

S201: activating the first pump 42 to supply water to the cleaning tank 21, and stopping supplying water when the water level in the cleaning tank 21 reaches a preset value;

S202: driving the record in the cleaning tank 21 to rotate within a first preset time, and activating the ultrasonic generator 83 to clean the record; and S203: activating the second pump 43 to discharge the water from the cleaning tank 21, and transporting the water to the water storage box 41.

As shown in FIG. 37, in some embodiments, in the cleaning only mode, the control method further includes: selecting whether to clean again before discharging the water in the cleaning tank.

If it is selected to clean again, the record in the cleaning tank is driven to rotate within a second preset time to perform a second cleaning for the record. The second preset time can be the same as the first preset time.

If it isn't selected to clean again, the step S203 is performed.

For example, in the cleaning only mode, the screen 63 displays "Repeat Cleaning Only" after the rotation of the record is completed in the step S202.

If "YES" is selected, the record will be cleaned again.

If "NO" is selected, the step S203 is performed.

The screen 63 displays "Completed" after the step 203 is completed.

As shown in FIG. 34, in some embodiments, the record cleaning machine 100 also has an air drying only mode. In one embodiment, the operating step of the air drying only mode is the same as step S104 described above. In the air drying only mode, the control method includes:

S304: activating the air drying system to dry the record.

Figure 38:
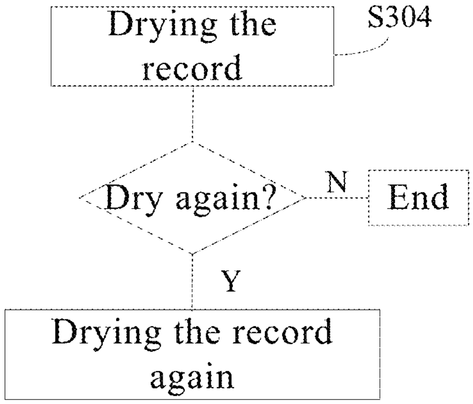
FIG. 38 is a flowchart of a control method in an air drying only mode according to an embodiment of the present application.

As shown in FIG. 38, in some embodiments, in the air drying only mode, the control method further includes: selecting whether to dry again after the air drying is completed once.

If it is selected to dry again, the air drying system is activated to dry the record again.

If it isn't selected to dry again, the air drying only mode is end.

For example, in the air drying only mode, the screen 63 displays "Repeat Drying Only" after the air drying is completed once.

If "YES" is selected, the air drying system will be activated to perform secondary air drying on the record.

If "NO" is selected, the air drying only mode is end and screen 63 displays "Completed".

In some embodiments, the first button 38 has multiple functions, and the control method includes:

Pressing the first button 38 and releasing it within a third preset time to pause the operation of the record cleaning machine; and pressing the first button again and releasing it within the third preset time to continue—the operation of the record cleaning machine. Optionally, the third preset time is 1 second.

In a first implementation, pressing the first button 38 and releasing it within 1 second when the record cleaning machine 100 is running to make the control system 60 to control the record cleaning machine 100 to pause operation based on signal from the first stroke switch 39. Then, pressing the first button again and releasing it within 1 second to make the control system 60 to control the record cleaning machine 100 to continue working based on the signal from the first stroke switch 39.

In a second implementation, pressing the first button 38 and releasing it within 1 second when the record cleaning machine 100 is running to make the control system 60 to control the record cleaning machine 100 to pause operation based on the signal from the first stroke switch 39. Then, pressing the first sub key 621 of the second button 62 to make the control system 60 to control the record cleaning machine 100 to continue working based on signal from the first sub key 621.

In a third implementation, pressing the first sub key 621 of the second button 62 when the record cleaning machine 100 is running to make the control system 60 to pause the operation of the record cleaning machine 100. Then, pressing the first sub key 621 again to make the control system 60 to control the record cleaning machine 100 to continue working.

Water in the cleaning tank can be drained by pressing the first button 38 for at least a fourth preset time when the record cleaning machine 100 is running. Optionally, the four preset times are 3 seconds.

For example, the control system 60 will discharge the water in the cleaning tank 21 based on the signal from the first stroke switch 39 if the first button 38 is pressed and held for more than 3 seconds. And, the next step of the current mode will be executed if the first button 38 is pressed and held for more than 3 seconds and the drainage is completed.

If there is water in the cleaning tank 21 when the record cleaning machine is not running, the water in the cleaning tank 21 can be drained by pressing the first button 38 three times shortly in a row to start the second pump 43. Press the first button 38 shortly means to press it and release it within the third preset time.

In some embodiments, the control method further comprises:

Pressing the third sub key 623 and the fourth sub key 624 of the second button 62 simultaneously to start water level adjustment; and Pressing the third sub key 623 or the fourth sub key 624 to adjust the water level in the cleaning tank.

For example, if the user is not satisfied with the water level when the cleaning tank 21 is filled with water, they can simultaneously press the third sub key 623 and the fourth sub key 624 of the second button 62. The cleaning machine 100 will pause the next step and start the water level adjustment program to adjust the water level in cleaning tank 21 by pressing the third sub key 623 or the fourth sub key 624. For example, pressing the third sub key 623 can raise the water level in the cleaning tank 21, and pressing the fourth sub key 624 can lower the water level in the cleaning tank 21. After adjusting the water level in cleaning tank 21, the next step can be continued by pressing the first button 38 or the first sub button 621.

Obviously, the above embodiments are only examples for clearly explaining the present application, and are not intended to limit the implementations. For those of ordinary skill in the art, other changes or modifications in different forms can be made on the basis of the above description. It is not necessary and impossible to exhaust all the implementations here. However, obvious changes or modifications derived therefrom are still within the scope of protection of the present application.

What is claimed is:

1. A record cleaning machine, comprising:
- a housing;
- a cleaning container, disposed in the housing, and provided with a cleaning tank;
- a support assembly, disposed at an opening of the cleaning tank, and configured to support and drive a record to rotate;
- a water supply system, comprising:
  - a water storage box disposed at the housing;
  - a first pump, communicated with the water storage box and the cleaning tank, and configured to supply water to the cleaning tank; and
  - a second pump, communicated with the water storage box and the cleaning tank, and configured to discharge water in the cleaning tank;
- an air dryer configured to dry the record;
- an ultrasonic generator disposed at a side wall of the cleaning container;
- a controller connected with the support assembly, the first pump, the second pump, the air dryer, and the ultrasonic generator; and
- a second bracket, disposed in the housing, and the water supply system being disposed in the second bracket; and
- the water storage box comprises:
  - a box body, provided with a water storage chamber with an open end, the first pump and the second pump being capable of communicating with the water storage chamber respectively, and a side wall of the box body away from the cleaning container being made of transparent material and provided with a water level gauge;
  - a water storage box shell, configured to seal the water storage chamber;
  - a water storage box outer cover, being provided on the second bracket, and the box body being disposed at the water storage box outer cover slidably; and
  - a first filter, disposed in the box body.

2. The record cleaning machine of claim 1, the housing comprising:
- a bottom shell;
- a support shell, an end of the support shell being connected to the bottom shell, and the cleaning container being disposed in the support shell;
- a top shell, connected to another end of the support shell, and provided with a receiving hole, the record being capable of passing through the receiving hole; and
- a transparent cover disposed on the top shell.

3. The record cleaning machine of claim 1, further comprising a first bracket disposed in the housing, and the cleaning container being pressed by the first bracket from above.

4. The record cleaning machine of claim 3, wherein the support assembly comprises:
- first adapters, disposed at the first bracket, and being capable of supporting a first record and driving the first record to rotate;
- second adapters, detachably disposed at the housing, and being capable of supporting a second record and driving the second record to rotate;
- third adapters, detachably disposed at the housing, and being capable of supporting a third record and driving the third record to rotate;
- a first driver, disposed at the first bracket, and connected to the first adapters to drive the first record to rotate;
- a second driver, disposed at the first bracket, and detachably connected to the second adapters to drive the second record to rotate; and
- a third driver, disposed at the first bracket, and detachably connected to the third adapters to drive the third record to rotate.

5. The record cleaning machine of claim 4, wherein each of the first adapters comprises:
- a first roller seat, disposed at the first bracket; and
- a first roller, rotatably connected to the first roller seat, and the first roller of at least one of the first adapters being connected to the first driver.

6. The record cleaning machine of claim 4, wherein each of the second adapters and the third adapters comprises:
- a second roller seat, detachably disposed at the housing;
- a second roller, rotatably connected to the second roller seat, the second roller of at least one of the second adapters being detachably connected to the second driver, and the second roller of at least one of the third adapters being detachably connected to the third driver; and
- a support, disposed at an end of the second roller seat and in the cleaning tank, the supports of the second adapters being matched with the second record, and the supports of the third adapters being matched with the third record.

7. The record cleaning machine of claim 6, wherein each second roller comprises:
- a first wheel body, rotatably connected to a corresponding second roller seat;
- a second wheel body, rotatably connected to the corresponding second roller seat, and slidably connected to the first wheel body;
- a third wheel body, disposed between the first wheel body and the second wheel body; and
- a first elastic, disposed between the first wheel body and the second wheel body, and being capable of pushing the first wheel body and the second wheel body away from each other.

8. The record cleaning machine of claim 4, wherein the support assembly further comprises:
- a slider, slidably disposed at the first bracket, and the second driver and the third driver both being disposed at the slider;
- a first button, disposed at the first bracket, and being capable of pushing the slider to slide in a direction away from the cleaning tank; and
- a second elastic, disposed between the slider and the first bracket, being capable of pushing the slider to slide in a direction close to the cleaning tank.

9. The record cleaning machine of claim 8, the support assembly further comprising a first stroke switch connected with the controller, and a contact plate being provided on the slider and being capable of abutting against the first stroke switch.

10. The record cleaning machine of claim 3, wherein the air dryer comprises:
- a first fan and a second fan, disposed at the first bracket; and
- a first air outlet piece, disposed at the first bracket, and provided with a first air outlet and a second air outlet, the first air outlet blowing out airflow of the first fan in a horizontal direction or an inclined upward direction, and the second air outlet blowing out airflow of the second fan in an inclined downward direction.

11. The record cleaning machine of claim 10, wherein the air dryer further comprises:

a third fan and a fourth fan, disposed at the first bracket; and a second air outlet piece, disposed at the first bracket, and provided with a third air outlet and a fourth air outlet, the third air outlet blowing out airflow of the third fan in the horizontal direction, and the fourth air outlet blowing out airflow of the fourth fan in the horizontal direction.

12. The record cleaning machine of claim 1, wherein the water supply system further comprises:

a temperature sensor, configured to detect water temperature in the cleaning tank, and connected with the controller; and a water level gauge, configured to detect water level in the cleaning tank, and connected with the controller.

13. The record cleaning machine of claim 1, wherein the controller comprises:

a circuit board, disposed inside the housing;

a second button, connected to the circuit board, including a plurality of sub keys, at least one of the sub keys being configured to confirm a current operation, and at least another of the sub keys being configured to cancel the current operation;

a screen, disposed at the housing, and connected to the circuit board; and a power assembly, connected to the circuit board.

14. The record cleaning machine of claim 13, wherein the power assembly comprises:

a power switch, connected to the circuit board;

a child lock switch, connected to the circuit board; and a gear selection switch, connected to the circuit board, and configured to select a working mode; and the record cleaning machine further comprises a handle disposed at the housing.

15. The record cleaning machine of claim 1, wherein a filtering groove is provided at a bottom of the housing, and an air inlet is provided at a bottom of the filtering groove; and the record cleaning machine further comprises a second filter disposed in the filtering groove and a USB connector disposed at the housing, and an inner wall of the filtering groove is provided with a plug hole matched with the USB connector.

* * * * *